US006328638B1

(12) United States Patent
Hopkins et al.

(10) Patent No.: US 6,328,638 B1
(45) Date of Patent: Dec. 11, 2001

(54) APPARATUS AND METHODS FOR RECOVERING ABRASIVE FROM AN ABRASIVE-LADEN FLUID

(75) Inventors: Jordan J. Hopkins, Shoreline; Jonathan M. Stewart, Seattle; Felice M. Sciulli, Issaquah; Katherine Zaring, Kent; Daniel Chin, Seattle; John Massenburg, Kent; Daniel Devine, Seattle, all of WA (US)

(73) Assignee: Flow International Corporation, Kent, WA (US)

( * ) Notice: Subject to any disclaimer, the term of this patent is extended or adjusted under 35 U.S.C. 154(b) by 0 days.

(21) Appl. No.: 09/491,684

(22) Filed: Jan. 26, 2000

Related U.S. Application Data

(63) Continuation-in-part of application No. 09/383,044, filed on Aug. 25, 1999, which is a continuation-in-part of application No. 09/069,223, filed on Apr. 28, 1998.

(51) Int. Cl.$^7$ .................................................... B24B 9/00
(52) U.S. Cl. ................... 451/88; 451/38; 451/40; 451/87
(58) Field of Search .................... 451/38, 39, 40, 451/75, 87, 88

(56) References Cited

U.S. PATENT DOCUMENTS

| 3,299,533 | 1/1967 | Morris .................................. 34/205 |
|-----------|--------|------------------------------------------------|
| 3,996,032 | 12/1976 | McWilliams et al. ................. 65/3 C |
| 4,031,006 | 6/1977 | Ramirez et al. ....................... 210/44 |
| 4,045,882 | 9/1977 | Buffington et al. .................... 34/171 |
| 4,094,399 | 6/1978 | George ................................. 198/535 |
| 4,186,087 | 1/1980 | Kato ..................................... 210/44 |
| 4,328,094 | 5/1982 | Peck .................................... 209/160 |

(List continued on next page.)

FOREIGN PATENT DOCUMENTS

| 4334673 C1 | 1/1995 | (DE) . |
| 19645142 A1 | 4/1998 | (DE) . |
| WO 96/16770 | 6/1996 | (WO) . |
| WO 98/17439 | 4/1998 | (WO) . |

OTHER PUBLICATIONS

"Abratec Recycling/Extraction", Intrec GmbH, Berling, Germany, 18 pp.
"Abrasive Recycling and Containment System", Foracon–Arcs–220, Foracon Maschinen—und Anglagenau GmbH & Co. KG, pp. 1–10, Jan. 20, 1998.
Carpco, "Physical Separation Systems for Mineral Processing", pp. 1–17.
Carpco Catalog, "Laboratory Equipment for Physical Separation of Materials", 44 pp.
Schreiber Equipment—Grit Classifier, http://135.143.3.189/eqgritclss.htm, 5 pp., printed Feb. 2, 1999 and Jul. 22, 1999.
Schreiber Corporation, Inc., "Aerated Grit & Grease Removal System", 41 pp.
Westfalia Separator, nc., "*Separation Technology*", http://www.westfaliaseparatorus,com/separate.html, 2 pp., printed Feb. 2, 1999.
Westfalia Separator Homepage, http://www.westfalia–separator.com, 2 pp., printed Jan. 2, 1999.

Primary Examiner—Eileen P. Morgan
(74) Attorney, Agent, or Firm—Seed Intellectual Property Law Group PLLC

(57) ABSTRACT

An improved apparatus and methods for recovering abrasive from an abrasive-laden fluid are shown and described. An abrasive-laden fluid handling device is coupled to a catcher tank to collect abrasive-laden fluid and transport it to a hydro-classifier. Wet recovered abrasive is discharged from the hydro-classifier and transferred to a de-watering device. The de-watering device removes water from the abrasive by decanting fluid and via use of an air eduction system. De-watered abrasive is then ejected from the de-watering device to a dryer unit, to be further dried and processed for reuse.

13 Claims, 17 Drawing Sheets

U.S. PATENT DOCUMENTS

| | | | |
|---|---|---|---|
| 4,417,406 | 11/1983 | Eibich | 34/155 |
| 4,436,433 | 3/1984 | Barnes | 366/152 |
| 4,753,020 | 6/1988 | Brunner | 34/196 |
| 4,872,293 | 10/1989 | Yasukawa et al. | 51/410 |
| 4,872,975 | 10/1989 | Benson | 210/99 |
| 4,999,115 | 3/1991 | Peterson | 210/728 |
| 5,038,498 | 8/1991 | Woolsey | 34/225 |
| 5,107,602 | 4/1992 | Lööf | 34/1 V |
| 5,127,199 | 7/1992 | Blankers et al. | 51/425 |
| 5,279,046 | 1/1994 | Vincent | 34/35 |
| 5,341,580 | 8/1994 | Teal | 34/446 |
| 5,361,910 | 11/1994 | Yang et al. | 209/13 |
| 5,433,862 | 7/1995 | Batson | 210/702 |
| 5,551,574 | 9/1996 | Hicks et al. | 209/164 |
| 5,643,058 | 7/1997 | Erichsen et al. | 451/99 |

APPARATUS AND METHODS FOR RECOVERING ABRASIVE FROM AN ABRASIVE-LADEN FLUID

CROSS-REFERENCE TO RELATED APPLICATIONS

This application is a continuation-in-part of U.S. patent application Ser. No. 09/383,044, filed Aug. 25, 1999 now pending, which is a continuation-in-part of U.S. patent application Ser. No. 09/069,223, filed Apr. 28, 1998, now pending.

TECHNICAL FIELD

This invention relates to apparatus and methods for recovering abrasive from an abrasive-laden fluid for use with abrasive jet cutting systems.

BACKGROUND OF THE INVENTION

Abrasive-jet cutting systems are used for cutting a wide variety of materials and for the production of a wide variety of products. In a typical abrasive-jet cutting system, abrasive particles are mixed with an ultra-high pressure fluid (e.g., water), and the resulting ultra-high pressure abrasive fluid is flowed through a cutting nozzle which directs an abrasive cutting jet onto a workpiece. The cutting nozzle may then be controllably moved across the workpiece to cut the workpiece into the desired shape. After the ultra-high pressure abrasive jet passes through the workpiece, the energy of the abrasive jet is dissipated and the abrasive fluid is collected in a catcher tank for disposal. Abrasive-jet cutting systems of this type are shown and described, for example, in U.S. Pat. No. 5,643,058 issued to Erichsen et al. and assigned to Flow International Corp. of Kent, Washington, which patent is incorporated herein by reference, corresponding to Flow's Bengal 4×4 and Paser 3 abrasive-jet cutting systems.

One abrasive material commonly used in abrasive-jet cutting systems is garnet. Garnet is well known for its hardness, resiliency, and overall performance in abrasive-jet cutting systems for a wide variety of workpiece materials. The cost of garnet, however, is not insubstantial. In existing abrasive-jet cutting systems, the consumable garnet particles represent 60 to 75 percent of the operating costs of the system. Research into the recovery and recycling of garnet particles indicates, however, that between 40 and 60 percent of the garnet particles are typically large enough to be recovered and recycled after initial use depending upon the material properties of the workpiece being cut. This fact makes abrasive recycling commercially viable.

Currently, abrasive recovery apparatus for use with abrasive-jet cutting systems may be divided into two broad categories. In a first category, the abrasive-laden fluid contained within the jet catcher of the abrasive jet cutting system is simply removed to a heater and subjected to heat to evaporate the fluid, leaving a mixture of abrasive particles and cuttings (or "fines") from the workpiece. This mixture of abrasive particles and cuttings is then sifted, such as through a system of successive screens, to remove the desirable abrasive particles from the undesirable cuttings and unusable particles.

In a second category, the abrasive-laden fluid is removed from the jet catcher and is separated by a wet separation process known as "classification" into a low-concentration abrasive flow and a wet recovered abrasive. The wet recovered abrasive is then heated to evaporate the fluid, leaving a mixture of dry recovered abrasive and cuttings for segregation. The low-concentration abrasive flow may simply be disposed of, or may be transported to a fine-separation tank to allow the fine particulates to settle and be recovered. In this second category of abrasive recovery systems, energy savings may be achieved because the low-concentration abrasive flow is not heated, with correspondingly lower operational costs. An abrasive recycling system of this type is shown and described, for example, in DE 19645142 issued to Hering et al. and assigned to Intrec Ges Innovative Technologien MbH of Berlin, Germany, which patent is incorporated herein by reference.

FIG. 1 is a schematic view of an existing abrasive recovery apparatus 10 of the type that uses classification. First, an abrasive-laden fluid 22 is pumped through the cutting head 12 to form an abrasive jet 14. The abrasive jet 14 is passed through a workpiece and collected in a catcher tank 16. A pump 18 draws the abrasive-laden fluid 22 from the catcher tank 16 and pumps it through a bypass 20 to a hydro-classifier 34.

The abrasive-laden fluid 22 enters into an upper portion 36 of a hydro-classifier 34. A clear-fluid pump 38 draws a clarified fluid 30 from a reserve tank 32 and pumps it into a lower portion 40 of the hydro-classifier 34. The abrasive-laden fluid 22 passes downwardly through a middle portion 42 of the hydro-classifier 34, while the clarified fluid 30 passes upwardly through the middle portion 42. The resulting mixing in the middle portion 42 of the hydro-classifier 34 causes the abrasive-laden fluid 22 to separate into a recovered abrasive 44 and a fine-particle flow 46. The recovered abrasive 44 collects in the bottom portion 40 of the hydro-classifier 34. The fine-particle flow 46 is routed to a clearing tank 26 for separation as described below.

The recovered abrasive 44 exits from the hydro-classifier 34 to a wet abrasive storage receptacle 47. If the wet abrasive storage receptacle 47 becomes filled to capacity, the bypass 20 directs the abrasive-laden fluid 22 directly to the clearing tank 26. An auger 48 transports the recovered abrasive 44 from the wet abrasive storage receptacle 47 to a dryer 50. In the dryer 50, the recovered abrasive 44 is heated to remove any remaining moisture, and is shaken and sifted through screens to separate the recovered abrasive 44 from any non-reusable particulates. The recovered abrasive 44 is then deposited into a collection tank 52 for reuse in the abrasive jet cutting system.

The fine-particle flow 46 is shunted to the clearing tank 26 where the particles are permitted to settle to the bottom. A sediment 27 which collects at the bottom of the clearing tank 26 includes cuttings from the workpiece as well as fine, non-reusable abrasive particulates. The sediment 27 is collected in a receptacle 28 for disposal or subsequent processing. Clarified fluid 30 exits from the settling tank 26 and is collected in the reserve tank 31. From the reserve tank 31, the clarified fluid 30 may be pumped by a filter pump 32 through a filter 33 and into a waste disposal system (not shown). Alternately, the clarified fluid 30 may be pumped by a return pump 35 from the reserve tank 31 back to the catcher tank 16 as necessary.

Although desirable results may be achieved using the abrasive recovery apparatus 10, certain characteristics may be improved. For example, the energy costs associated with the dryer 50 remain high and the throughput of the dryer 50 is low. Furthermore, the hydro-classifier 34 is typically extremely large. These characteristics tend to make the abrasive recovery apparatus 10 economically non-viable and it is impractical for most cutting environments.

SUMMARY OF THE INVENTION

This invention relates to apparatus and methods for recovering abrasive from an abrasive-laden fluid for use with abrasive jet cutting systems. In one aspect, an apparatus in accordance with the invention includes an abrasive-laden fluid handling device coupled to a catcher tank of an abrasive jet cutting system, a pre-classifier fluidly coupled to the abrasive-laden fluid handling device, a hydro-classifier fluidly coupled to the pre-classifier, a fine-particle separation tank fluidly coupled to a clarified-fluid flow outlet of the hydro-classifier, a wet abrasive receptacle positioned to receive a wet recovered abrasive discharged from the hydro-classifier, a de-watering device engageable with the wet recovered abrasive in wet abrasive receptacle, and a dryer unit.

In operation, the abrasive-laden fluid handling device provides an abrasive-laden fluid from the catcher tank without requiring mechanical agitators. The pre-classifier separates the abrasive-laden fluid into a high concentration abrasive flow that enters the hydro-classifier, and a low concentration abrasive flow that is shunted back to the catcher tank, advantageously allowing a smaller, more economical and practical hydro-classifier to be used. Further, the de-watering device removes a residual, interstitial fluid content from the wet recovered abrasive, thereby reducing the energy costs associated with drying the recovered abrasive.

In a further aspect, the abrasive-laden fluid handling device includes an abrasive-laden fluid conduit having a first end in fluid communication with the catcher tank and an abrasive-laden fluid outlet positioned outside of the catcher tank. The abrasive-laden fluid handling device may include a fluid drive system coupled to the abrasive-laden fluid conduit, the fluid drive system driving abrasive-laden fluid contained within the catcher tank through the abrasive-laden fluid conduit. Alternately, the abrasive-laden fluid handling device may include a backflush valve that may be actuated to drive the abrasive-laden fluid back into the catcher tank, thereby flushing an abrasive buildup from the intake of the abrasive-laden fluid conduit. In a further aspect, the fluid drive system includes a pressurized gas source attached to the abrasive-laden fluid conduit.

In another aspect, an abrasive recovery apparatus includes a de-watering device including a housing having a wet abrasive intake and a de-watered abrasive outlet spaced apart from the wet abrasive intake. The housing is coupled to an eduction system that selectively draws air through the wet recovered abrasive to remove interstitial moisture from the wet abrasive, resulting in de-watered abrasive. In a first preferred embodiment, the housing includes an eductor port situated along an abrasive travel path extending between the wet abrasive intake and the de-watered abrasive outlet, an eductor inlet coupled to the eductor port and coupleable to a source of eduction air, and a transport device that transports the wet recovered abrasive along the abrasive travel path. In yet another aspect, the housing comprises a cylindrical housing and the transport device comprises an auger rotatably disposed within the cylindrical housing. In a further aspect, the apparatus includes an airflow control valve fluidly coupled to the eductor port. The airflow control valve may be positionable in a first position to draw an entrained airflow from within the housing through the eductor port, and a second position to backflow the eduction air through the eductor port into the housing.

In an alternative preferred embodiment, wet abrasive is selectively provided to a collection tube of a de-watering device, in response to pressures in the hydro-classifier, such pressures being measured by a pressure transducer coupled to the hydro-classifier. Flow to the collection tube of the de-watering device is selectively permitted and stopped by selectively opening and closing a valve positioned at a bottom region of the hydro-classifier and selectively activating and deactivating a fluid eductor coupled to the hydro-classifier adjacent the valve. Once a selected amount of wet abrasive is allowed to flow into the collection tube of the de-watering device, the flow of wet abrasive is stopped, and a valve coupled to the housing is opened to decant fluid from the wet abrasive. An eductor coupled to the housing is activated to draw air through the wet abrasive, to further de-water the abrasive, resulting in the generation of a slug of de-watered abrasive. Once the de-watering is complete, the collection tube is rotated from a substantially vertical position to a substantially horizontal position, and the slug of de-watered abrasive is ejected via pressurized air to the dryer. The collection tube is then rotated to a substantially vertical position to once again receive a selected quantity of wet abrasive.

In yet another aspect, a vacuum transport device includes a dried abrasive receptacle, a vacuum pickup having a first end coupleable to a source of vacuum and a second end at least partially disposed within the dried abrasive receptacle and engageable with a volume of dried abrasive therein, and a standoff housing at least partially disposed about the vacuum pickup and at least partially engageable into the volume of dried abrasive, the standoff housing being positioned relative to the vacuum pickup to maintain a standoff distance between the vacuum pickup and a repose surface of the dried abrasive. The standoff housing maintains the standoff distance between the vacuum pickup and the repose surface to prevent clogging and ensure operation of the vacuum transport device.

In still another aspect, an abrasive recovery apparatus includes a pre-classifier having an abrasive-laden fluid inlet fluidly coupled to an abrasive-laden fluid flow, the pre-classifier separating the abrasive-laden fluid flow into a low-concentration abrasive flow and a high-concentration abrasive flow, and having a low-concentration flow outlet and a high-concentration flow outlet. The pre-classifier may include a turning plate that centrifugally separates the low-concentration flow from the high-concentration flow.

DETAILED DESCRIPTION OF THE INVENTION

The present disclosure is directed toward apparatus and methods for recovering abrasive from an abrasive-laden fluid for use with abrasive jet cutting systems. Specific details of certain embodiments of the invention are set forth in the following description, and in FIGS. 2–18, to provide a thorough understanding of such embodiments. A person of ordinary skill in the art, however, will understand that the present invention may have additional embodiments, and that the invention may be practiced without several of the details described in the following description.

Figure 1:
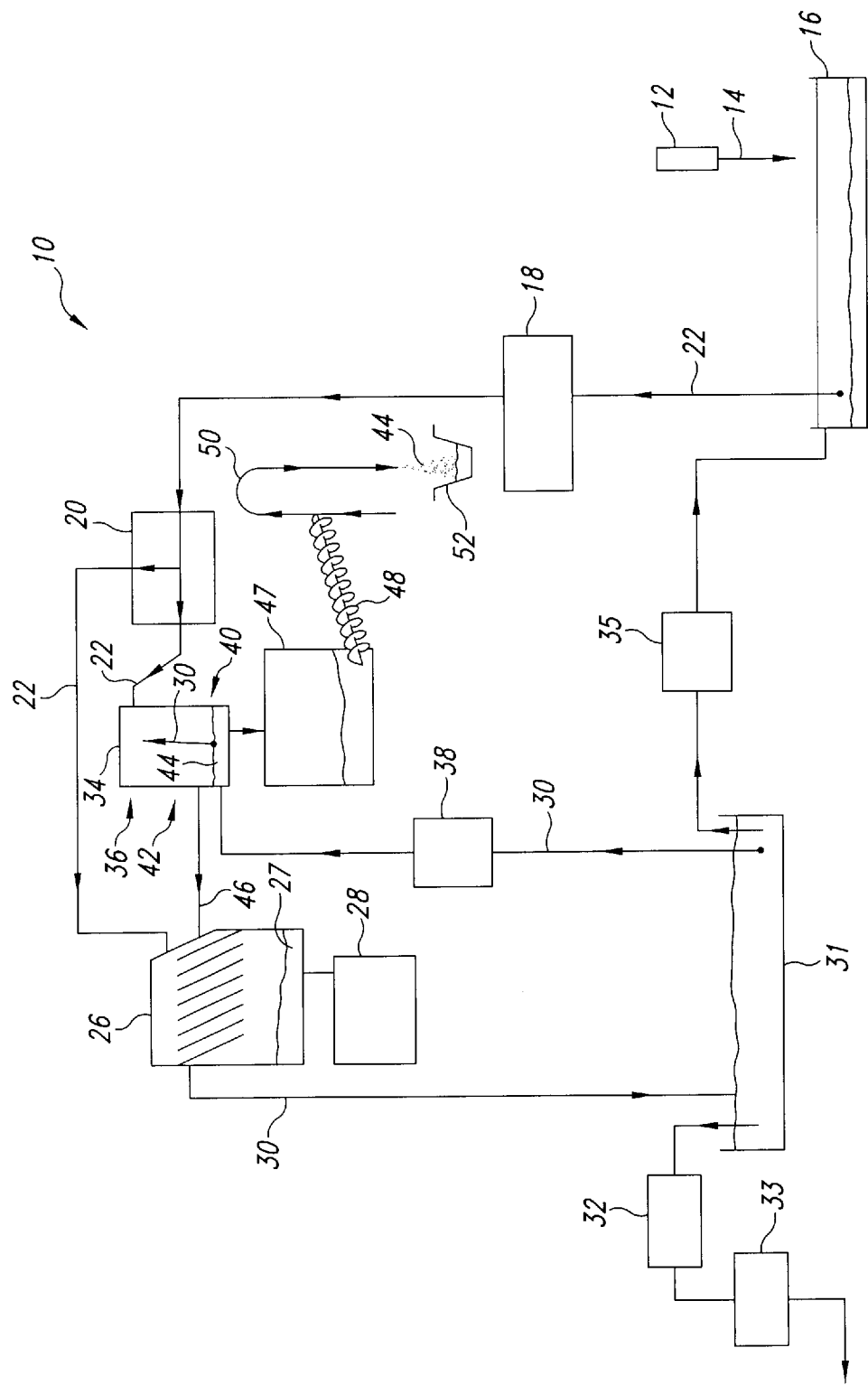
FIG. 1 is a schematic view of an abrasive recovery apparatus for an abrasive jet cutting system in accordance with the prior art.
Figure 2:
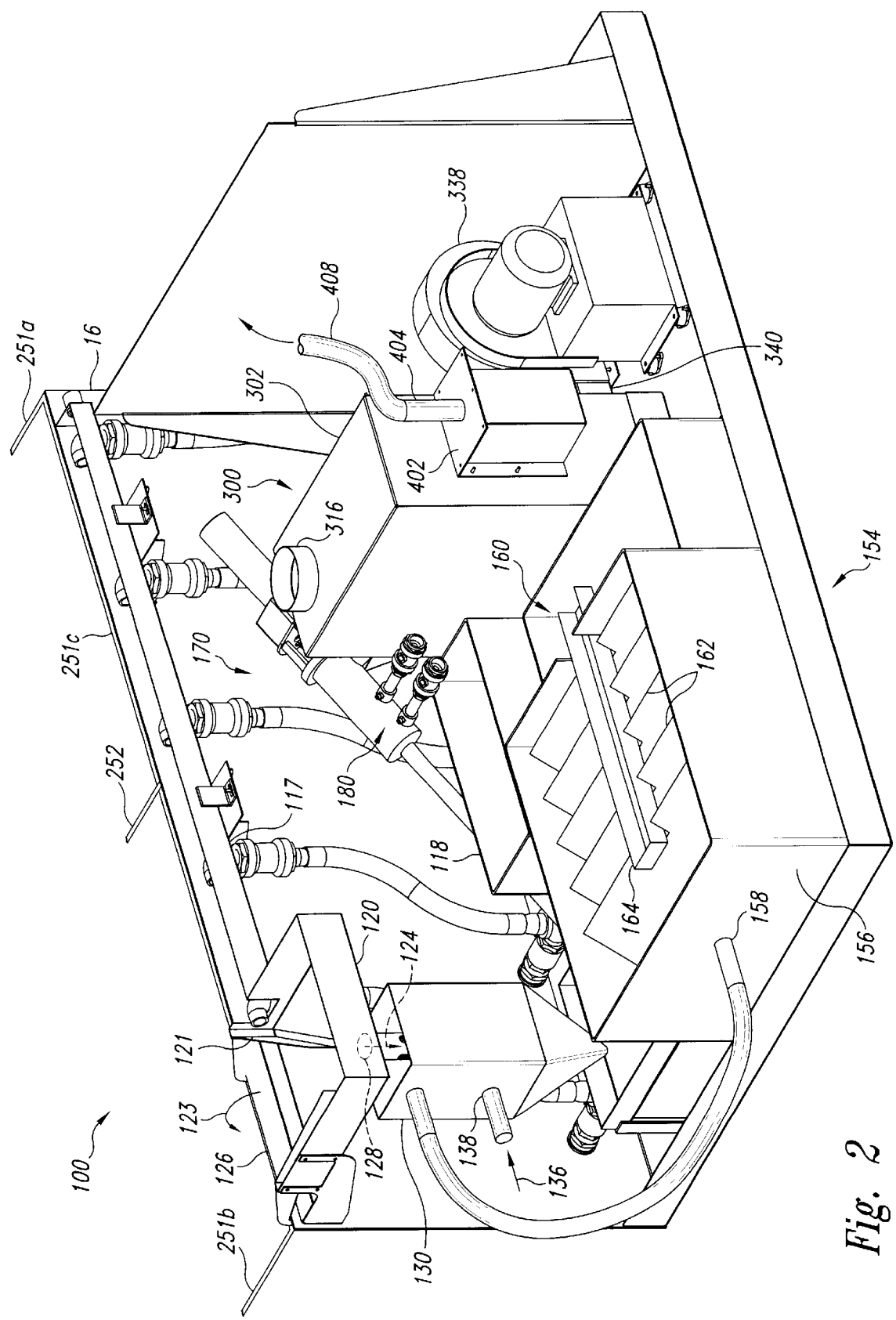
FIG. 2 is an isometric view of an abrasive recovery apparatus for an abrasive jet cutting system in accordance with an embodiment of the present invention.
Figure 3:
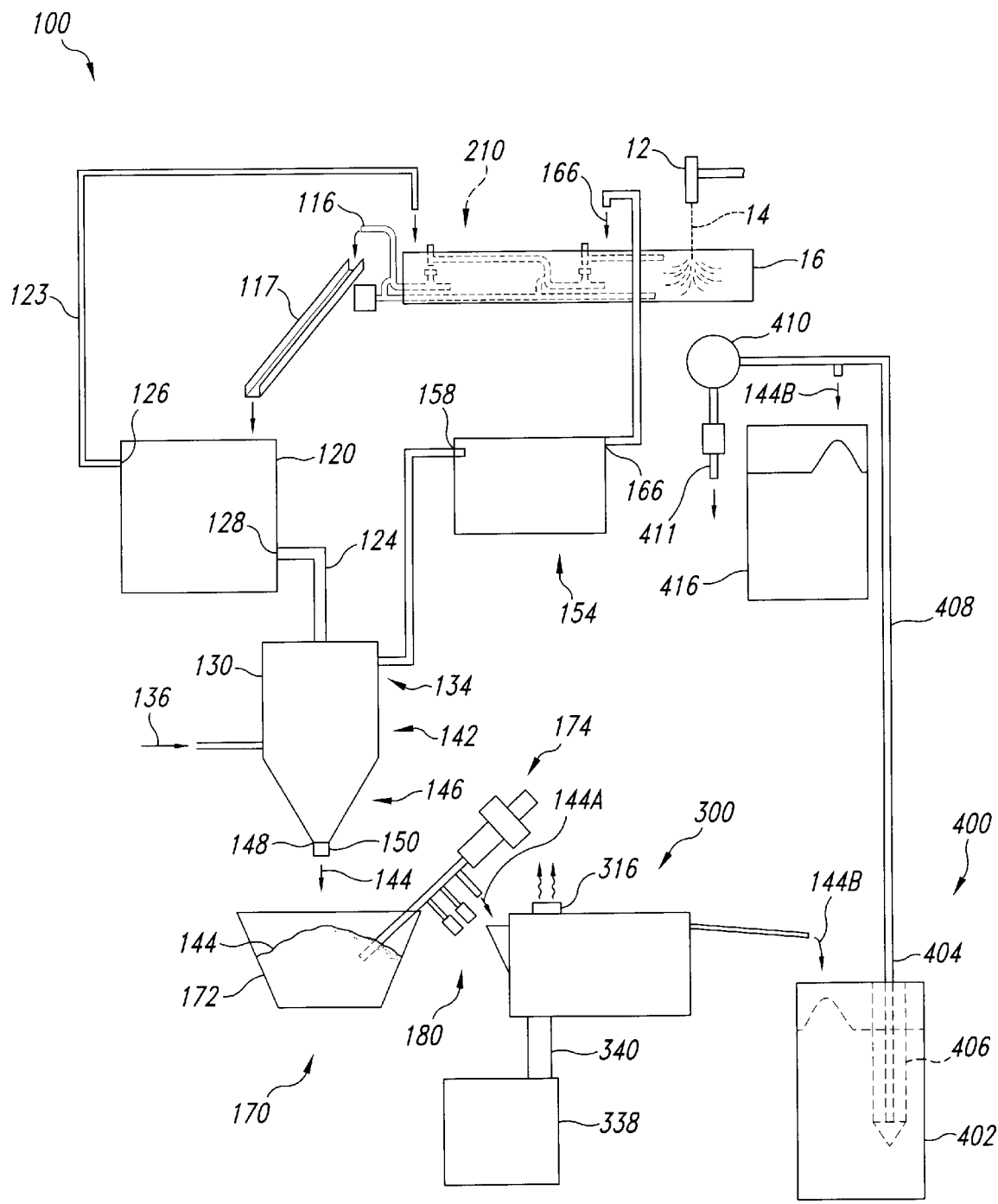
FIG. 3 is a schematic view of the abrasive recovery apparatus of FIG. 2.

FIG. 2 is an isometric view of an abrasive recovery apparatus 100 for use with an abrasive jet cutting system in accordance with the present invention. FIG. 3 is a schematic view of the abrasive recovery apparatus 100 of FIG. 2 in operation with a catcher tank 16 and cutting head 12 of an abrasive jet cutting system. In this embodiment, the abrasive recovery apparatus 100 includes an abrasive-laden fluid handler 210 that continuously removes abrasive-laden fluids from the catcher tank 16 without using mechanical agitators to suspend the abrasive particles in the waste fluid. The abrasive recovery apparatus 100 also includes a pre-classifier 120 that improves the quality and limits the amount of abrasive-laden flow entering a hydro-classifier 130. Finally, the apparatus 100 includes a de-watering device 170 that removes fluid from a wet recovered abrasive prior to entering a dryer, improving the drying process and the economic feasibility of the system.

Figure 4:
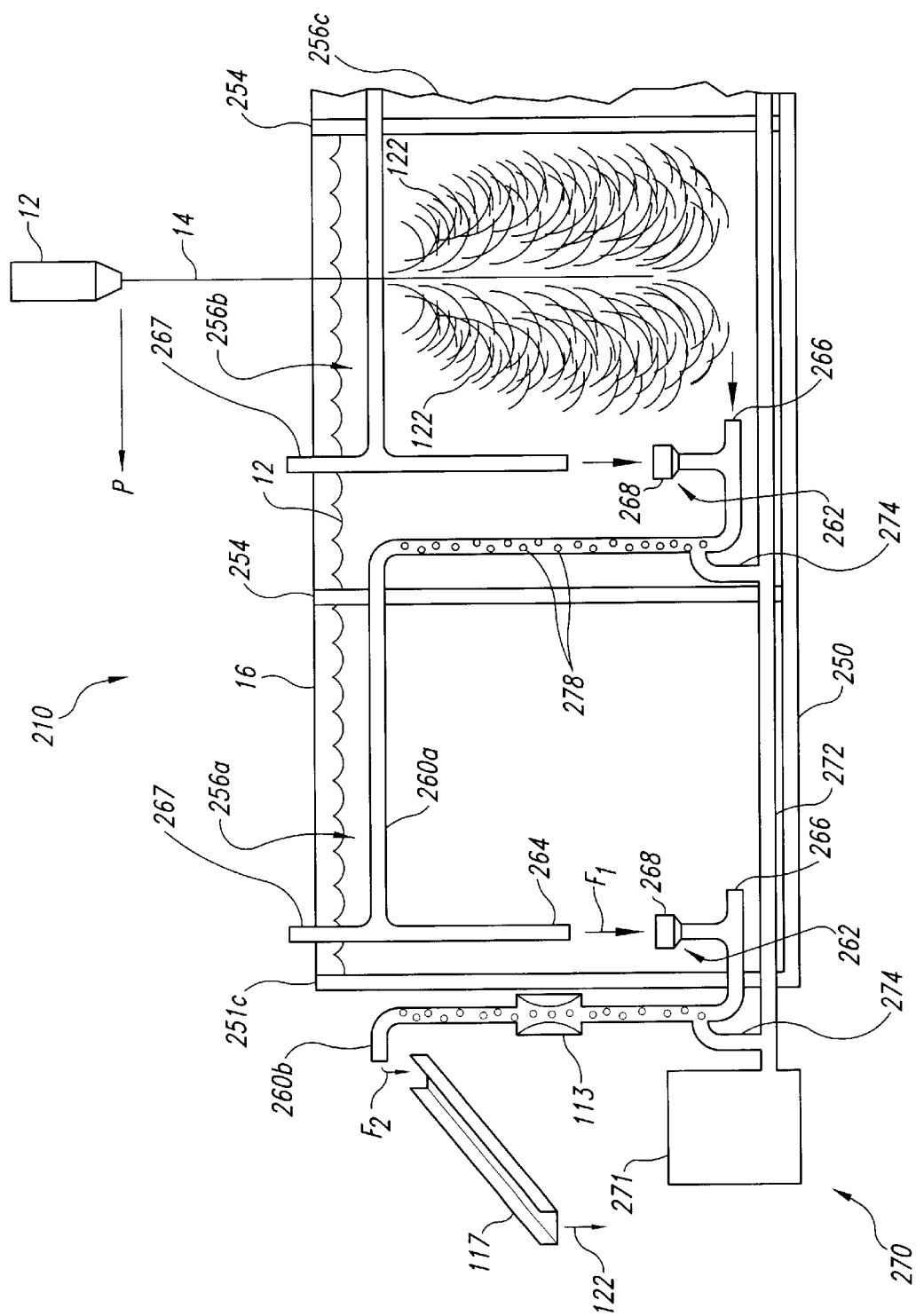
FIG. 4 is a partially-sectional isometric view of an embodiment of an abrasive-laden fluid collection device of the abrasive recovery apparatus of FIG. 2.

FIG. 4 is a cross-sectional side elevational view of an embodiment of the abrasive-laden fluid handler 210 of FIG. 2. The abrasive-laden fluid handler 210 is fully shown and described in co-pending U.S. patent application Ser. No. 09/069,223, incorporated herein by reference.

Referring to FIGS. 2–4, the catcher tank 16 includes a bottom panel 250, first and second side-walls 251a and 251b projecting upward from opposing sides of the bottom panel 250, and first and second end-walls 251c and 251d projecting upward from opposing ends of the bottom panel 250. The first and second side-walls 251a and 251b are attached to the first and second end-walls 251c and 251d to form a large cavity. The catcher tank 16 also includes a central divider 252 (see FIG. 2) extending longitudinally within the tank 16, and a plurality of crossing dividers 254 extending transverse to the central divider 252. The dividers 252 and 254 define a plurality of compartments 256 (identified by reference numbers 256a–256c) in the catcher tank 16. One commercially-available catcher tank 16 suitable for this purpose is the catcher tank of the Bengal 4×4 abrasive-jet cutting system available from Flow International Corp. of Kent, Wash.

The compartments 256 receive the abrasive-laden fluid 14 from the cutting head 12 as the cutting head 12 is traversed along a cutting path P. Additionally, each compartment 256 is configured to control the abrasive-laden fluid 122 within the tank 16. For example, when the abrasive jet 14 is aligned with compartment 256b, the dividers 252 and 254 defining this compartment control the fluid flow such that the abrasive jet 14 alone suspends a significant portion of the abrasive particles in the abrasive-laden fluid 122. As such, by dividing the tank 16 into smaller compartments 256, the abrasive jet 14 maintains at least a substantial portion of the abrasive particles in suspension in the abrasive-laden fluid 122 within a particular compartment aligned with the abrasive jet 14 without additional mechanical agitation. Typically, each compartment is approximately between 1'×1' and 4'×8', and more preferably about 2'×4'. As explained in more detail below, the abrasive-laden fluid handler 210 continuously removes abrasive-laden fluid 122 and abrasive particles from the compartments 256.

As shown in FIG. 4, the abrasive-laden fluid handler 210 includes a number of conduit sections 260 (identified by reference numbers 260a and 260b). The conduit sections 260 are configured to transport abrasive-laden fluid 122 from the compartments 256a, 256b and 256c. The conduit sections 260 include at least a first conduit section 260a having a first end 262 positioned in the lower portion of compartment 256b and a second end 264 positioned in compartment 256a. The first conduit section 260a also has a first intake opening 266 proximate to the bottom panel 250, a second intake opening 268 located to receive a fluid flow from a conduit section from the adjacent upstream compartment 256c, and a vent 267 toward the second end 264. The second intake opening 268, for example, can be a funnel. The conduit sections 260 can also include a second conduit section 260b similar to the first conduit section 260a, and thus like reference numbers refer to like components. The second conduit section 260b has a first end 262 positioned in the lower portion of compartment 256a and a second end 264 coupled to a trough 117. The second intake opening 268 of the second conduit section 260b is located to receive a first fluid flow $F_1$ from the second end 264 of the first conduit section 260a in a so-called "cascade" arrangement. Accordingly, the first and second conduit sections 260a and 260b define a conduit that transports the abrasive-laden fluid 122 from the compartments 256a and 256b to the trough 117.

To generate fluid flows through the conduit sections 260, a fluid drive system 270 is preferably coupled to the conduit sections 260 to drive the abrasive-laden fluid 122 through the conduit sections 260. In this particular embodiment, the fluid drive system 270 includes a fluid driver 271, a primary line 272 coupled to the fluid driver 271, and a plurality of branch feed lines 274 coupled to the primary line 272. The fluid driver 271 can be a pressurized gas source, such as an air compressor. The primary line 272 generally passes through the dividers 252 and 254 to supply pressurized gas to all of the compartments 256. The branch feed lines 274 are attached to the conduit sections 260 below the fluid level of the abrasive-laden fluid 122 in the compartments 256.

In operation, the pressurized gas source 271 injects a compressed gas 278, such as air, into the conduit sections 260. The compressed gas 278 is metered into the bottom of each conduit section 270. The gas 278 accordingly rises through the vertical portions of the conduit sections 260, creating a pumping action that draws abrasive-laden fluid 122 through the conduit sections 260. The gas 278 passes through the vents 267, while the fluid 122 continues to flow through the conduit sections 260. The second conduit section 260b includes a backflush valve 113 which may be used to selectively control the flow of the abrasive-laden fluid 122 out of the catcher tank 16. The fluid drive mechanism 270, therefore, generates the first fluid flow $F_1$ through the first conduit section 260a and a second fluid flow $F_2$ through the second conduit section 260b and into the trough 117. Typically, each conduit section 260 consumes approximately 3 to 5 SCFM and generates approximately 10 GPM of abrasive-laden fluid flow through the conduit section 260.

The abrasive-laden fluid handler 210 removes abrasive-laden fluid 122 from at least one of the compartments 256 as the abrasive jet 14 moves along the cutting path P. As the abrasive jet 14 passes over the compartment 256b, the abrasive jet 14 agitates the abrasive-laden fluid 122 to suspend a significant portion of abrasive particles within the compartment 256b without additional mechanical agitation. The compartment 256b is properly sized to permit the abrasive jet 14 to adequately suspend abrasive particles (and fines) in the abrasive-laden fluid 122 without additional mechanical agitation because the dividers 252 and 254 concentrate the turbulence generated by the abrasive jet 14 and contain the abrasive particles within the relatively small volume of compartment 256b. The fluid flow $F_1$ through the first conduit section 260a accordingly draws a portion of the abrasive-laden fluid 122 and the suspended abrasive particles through the first conduit section 260a. The first fluid flow $F_1$ exits from the first conduit section 260a, and the second fluid flow $F_2$ in the second conduit section 260a draws the first fluid flow $F_1$ into the second intake opening 268 of the second conduit section 260b. The abrasive-laden fluid 122 from compartment 256b is thus transported to the trough 117 through the first and second conduit sections 260a and 260b.

Occasionally, a buildup of abrasive will develop in the catcher tank 16 around the intake openings 266 of the conduit sections 260, obstructing the intake openings 266 and hampering the flow of abrasive-laden fluid into the conduit sections 260. If enough abrasive buildup occurs, the air bubbles from the fluid drive system 270 will not be able to unplug the intake openings 266. To remedy this problem, the backflush valve 113 (shown in FIG. 4 as a "pinch" valve) may be periodically closed to force air through the conduit sections 260 and out the intake openings 266, flushing out any buildup of abrasive in the intake region and preventing clogging. The backflushing operation may be automatically controlled by coupling the backflush valve 113 to a control system and a timer.

The abrasive-laden fluid handler 210 advantageously removes the abrasive from the catcher tank 16 without the need for periodic shoveling of the catcher tank 16. In this way, the costs associated with the labor-intensive task of removing the abrasive from the tank and the downtime of the abrasive-jet cutting system are avoided. Another advantage is that the abrasive-laden fluid handler 210 provides a continuous flow of abrasive-laden fluid to the remaining components of the abrasive recovery apparatus 100.

As best shown in FIG. 2, the abrasive-laden fluid 122 flows through the trough 117 and enters the pre-classifier 120. The pre-classifier 120 includes a turning plate 121 that causes the flow of abrasive-laden fluid 122 to be turned. In the embodiment shown in FIG. 2, the turning plate is positioned at an approximately 45 degree angle to the initial flow direction of the abrasive-laden fluid 122. The pre-classifier 120 also includes a low-concentration abrasive flow outlet 126 and a high-concentration abrasive outlet 128.

In operation, the abrasive-laden flow 122 enters the pre-classifier 120 and is turned by the turning plate 121, subjecting the abrasive-laden flow 122 to a centrifugal force. As the abrasive-laden flow 122 turns around the end of the turning plate 121, it is accelerated, thereby using the centrifugal force to separate the abrasive-laden flow 122 into a low-concentration abrasive flow 123 and a high-concentration abrasive flow 124. The high-concentration abrasive flow 124 flows out of the high-concentration abrasive flow outlet 128 and into a hydro-classifier 130, as described more fully below. The low-concentration abrasive flow 123 exits from the pre-classifier 120 through the low-concentration abrasive flow outlet 126 and back into the catcher tank 16.

Figure 5:
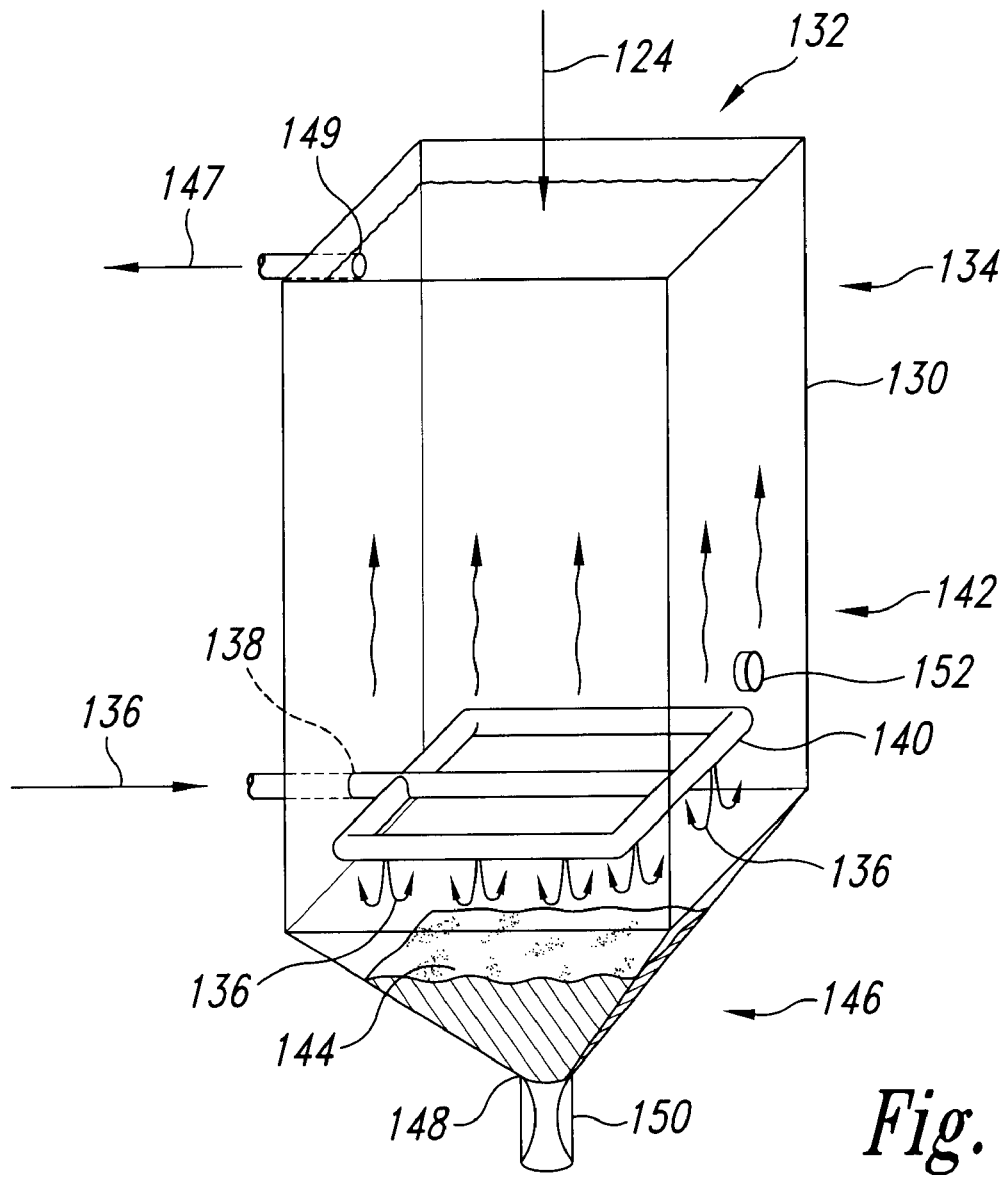
FIG. 5 is a partially-sectional isometric view of embodiment of a hydro-classifier of the abrasive recovery apparatus of FIG. 2.

FIG. 5 is a partially-sectional isometric view of an embodiment of the hydro-classifier 130 of the abrasive recovery apparatus 100 of FIG. 2. The hydro-classifier 130 includes an open top 132 through which the high-concentration abrasive fluid 124 enters an upper portion 134 of the hydro-classifier 130. A teeter fluid inlet 138 is disposed within a middle portion 142 of the hydro-classifier 130 and is coupled to a source of teeter (or "clarified") fluid 136. A manifold 140 distributes the teeter fluid 136 into the middle portion 142 of the hydro-classifier 130. The teeter fluid 136 rises upwardly through the middle portion 142 and mixes with the high-concentration abrasive fluid 124 flowing downwardly from the upper portion 134.

The mixing of the teeter fluid 136 with the high-concentration abrasive fluid 124 separates a recovered abrasive 144 from a fine particle flow 147. The fine-particle flow 147 exits from the upper portion of 134 of the hydro-classifier 130 via a fine-particle flow outlet 149. As shown in FIG. 5, the recovered abrasive 144 collects in a lower portion 146 of the hydro-classifier 130. The lower portion 146 includes a recovered abrasive outlet 148. A wet abrasive control valve 150 is coupled to the recovered abrasive outlet 148 and is adjustably positionable between an open and a closed position. The wet abrasive control valve 150 may be any suitable type, including, for example, a pinch valve.

A pressure transducer 152 is disposed within the middle portion 142 of the hydro-classifier 130. The pressure transducer 152 senses a fluid pressure within the hydro-classifier 130. Based on the pressure measured by the pressure transducer 152, the level of recovered abrasive 144 in the lower portion 146 may be determined. Based on a measured pressure signal from the pressure transducer 152, the wet abrasive control valve 150 may be opened to release the recovered abrasive 144 from the hydro-classifier 130. Commercially-available hydro-classifiers suitable for this purpose include, for example, those available from Carpco, Inc. of Jacksonville, Fla.

The pre-classifier 120 advantageously improves the abrasive concentration of the fluid entering the hydro-classifier 130. Because the low-concentration abrasive flow 123 is separated from the high-concentration abrasive flow 124 by the centrifugal force and is re-directed back into the catcher tank 16, the volume of fluid entering the hydro-classifier 130 is reduced, and the concentration of abrasive within the fluid entering the hydro-classifier 130 is increased. Because the size and efficiency of the hydro-classifier 130 is driven by the concentration of the abrasive-containing fluid entering the hydro-classifier 130, the pre-classifier 120 advantageously permits a smaller, more economically feasible hydro-classifier 130 to be used. Thus, the pre-classifier 120 improves the economic feasibility of the abrasive recovery apparatus 100 and enables the apparatus to be employed more practically in a wide variety of environments.

Similarly, the abrasive-laden fluid handler 210 advantageously improves the abrasive concentration of the fluid entering the hydro-classifier 130. The abrasive-laden fluid handler 210 captures the abrasive-laden fluid 122 that contains a higher concentration of abrasive than the previous method of simply pumping fluid from the catcher tank 16. The abrasive-laden fluid handler 210 captures the abrasive-laden fluid 122 from the compartments 256 into which the abrasive jet 14 enters the catcher tank 16, thus enabling a higher concentration abrasive-laden fluid 122 to be captured and removed from the catcher tank 16. In turn, the higher concentration of abrasive-laden fluid 122 entering the hydro-classifier 130 advantageously permits a smaller, more economically feasible hydro-classifier 130 to be used. Thus, the abrasive-laden fluid handler 210 improves the economic feasibility and practicality of the abrasive recovery apparatus 100.

Figure 6:
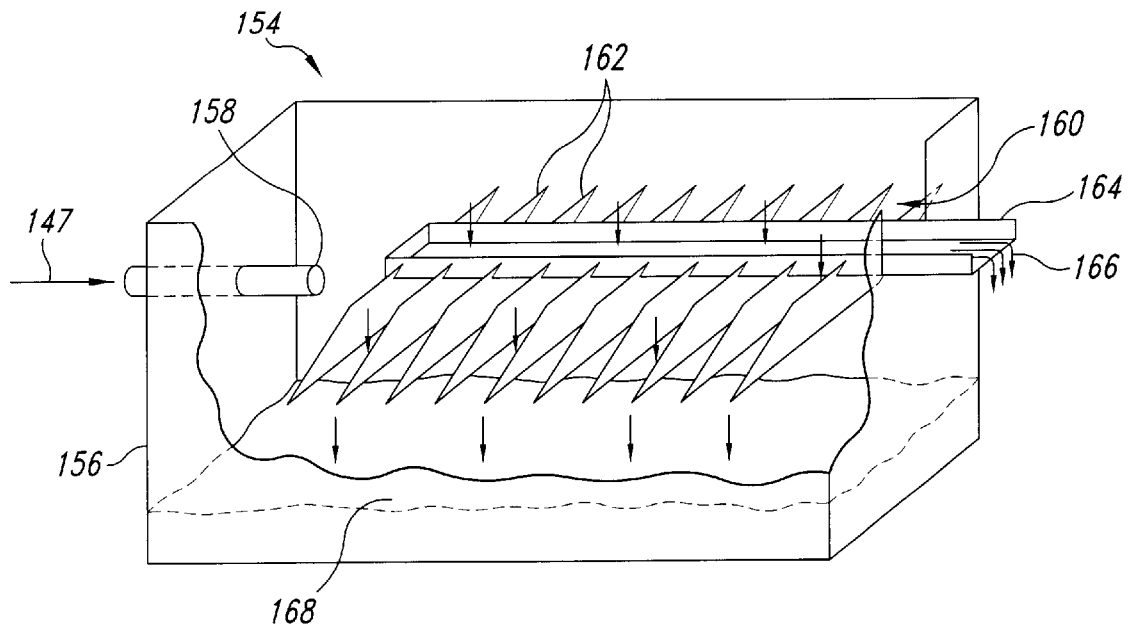
FIG. 6 is a partially-sectional isometric view of an embodiment of a fine-particle separation tank of the abrasive recovery apparatus of FIG. 2.

FIG. 6 is a partially-sectional isometric view of an embodiment of a fine-particle separation device 154 of the abrasive recovery apparatus 100 of FIG. 2. The particle separation device 154 includes a settling tank 156 having a fine-particle flow inlet 158 and a clarified fluid outlet 160. A plurality of baffles 162 are positioned within the settling tank 156 between the fine-particle flow inlet 158 and the clarified fluid outlet 160. The baffles 162 slow the speed of the flow entering the settling tank 156 and provide additional surface area for the accumulation of fine particles. A collection trough 164 is disposed within the settling tank 156, traversing the settling tank 156 through cutouts in the baffles 162 and projecting out of the clarified fluid outlet 160.

In operation, the fine-particle flow 147 enters the settling tank 156 through the fine-particle flow inlet 158. The fine-particle flow 147 encounters the baffles 162 which slow the flow and inhibit turbulence within the settling tank 156. Into relatively stagnant settling tank 156, the fine particle flow 147 separates into a clarified fluid 166 and a fine sediment 168. The fine sediment 168 collects on the baffles 162 and eventually drops to the bottom of the settling tank 156 for subsequent removal and disposal. As the fluid level within a settling tank 156 increases, the clarified fluid 166 flows over the edges of and into the collection trough 164, passing through the collection trough 164 and out the clarified fluid outlet 160. The clarified fluid 160 may then be pre-circulated into the catcher tank 16 of the abrasive jet cutting system, or may be disposed of in an environmentally conscious manner. Suitable fine-particle separation of devices 154 include, for example, the wet separation gravity separators commercially-available from Outokumpu Technology, Inc. of Jacksonville, Fla.

Figure 7:
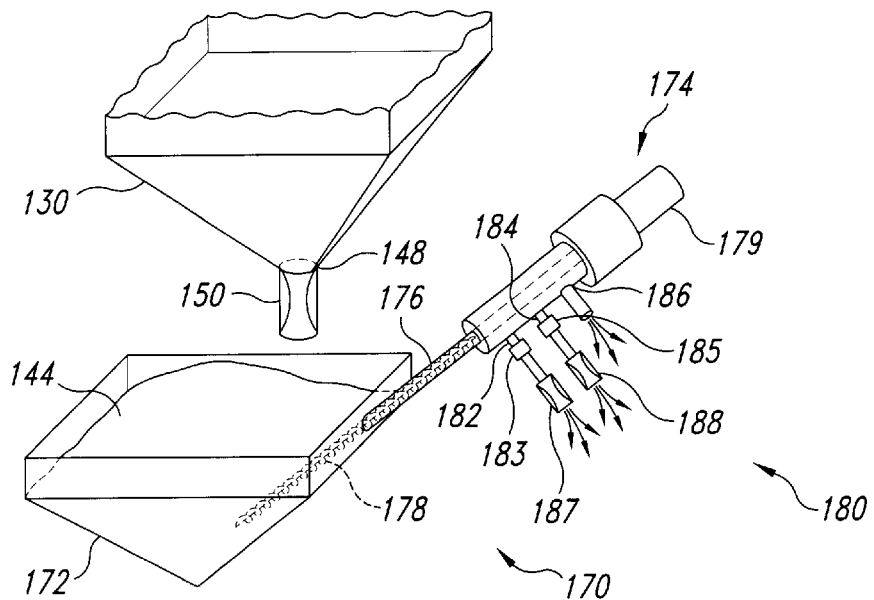
FIG. 7 is a partially-sectioned isometric view of an embodiment of a de-watering device of the abrasive recovery apparatus of FIG. 2.

FIG. 7 is a partially-sectional isometric view of an embodiment of a de-watering device 170 of the abrasive recovery apparatus 100 of FIG. 2. The de-watering device 170 includes a wet abrasive receptacle 172 that receives the recovered abrasive 144 from the wet abrasive outlet 148 of the hydro-classifier 130, and a wet abrasive transport device 174 having a cylindrical housing 176 that surrounds an auger 178. The auger 178 transports the wet recovered abrasive 144 through the cylindrical housing 178 past first and second air eduction ports 182, 184 to a de-watered abrasive outlet 186. A variable speed motor 179 is coupled to the cylindrical housing 178 to drive the auger 178. The recovered abrasive 144 exits from the de-watered abrasive outlet 186 to a dryer unit 300 (see FIG. 3).

The de-watering device 170 also includes an air eduction system 180 having first and second eduction air inlets 183, 185 coupled to the first and second eductor ports 182, 184, respectively. First and second airflow valves 187, 188 are also coupled to the first and second eductor ports 182, 184, respectively, to control a flow of air through the first and second eductor ports 182, 184.

Figure 8:
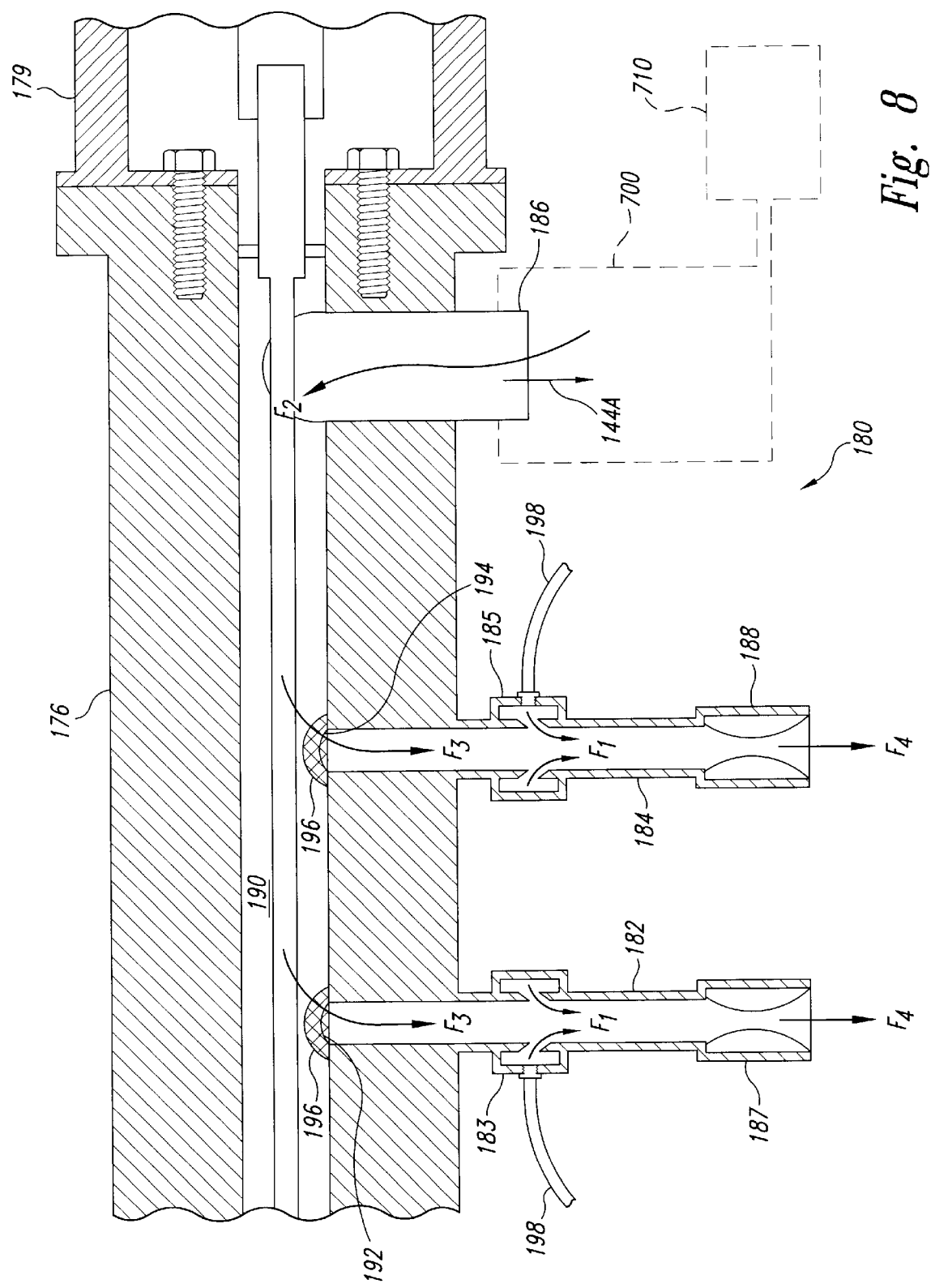
FIG. 8 is an enlarged partial cross-sectional view of the air eduction device of FIG. 7.

FIG. 8 is an enlarged partial cross-sectional view of the air eduction system 180 of FIG. 7. As shown in FIG. 8, the first eductor port 182 fluidly communicates with an interior region 190 of the cylindrical housing 176 via a first conductor aperture 192. Similarly, the second eductor port 184 fluidly communicates with the interior region 190 via a second eductor aperture 194. Screens 196 cover the first and second eductor apertures 192, 194 to prevent the outflow of the wet recovered abrasive 144 (not shown) out of the interior region 190. The first and second eduction air inlets 183, 185 are fluidly coupled to a source of high-pressure air by air supply lines 198.

In a first mode of operation, the first and second airflow valves 187, 188 are opened, and a high-pressure air $F_1$ from the air supply lines 198 enters the first and second eduction air inlets 183, 185. As the high-pressure air $F_1$ travels through the first and second air eductor ports 182, 184, a flow of entrained air $F_2$ is pulled by the high-pressure air $F_1$ into the interior region 190 of the cylindrical housing 176 through the dried-abrasive outlet 186. The flow of entrained air $F_2$ is drawn by the high-pressure air $F_1$ through the wet recovered abrasive 144 (not shown) in the interior region 190 where it evaporates and collects moisture from the wet recovered abrasive 144. A wet entrained airflow $F_3$ is then drawn through the screens 196 and into the first and second air eductor ports 182, 184. The wet entrained airflow $F_3$ mixes with the high-pressure air $F_1$ to form a wet exhaust flow $F_4$ that is blown out of the first and second airflow valves 187, 188.

Thus, in the first mode of operation shown in FIG. 8, the air eduction system 180 advantageously removes a residual, interstitial moisture content from the wet recovered abrasive 144. As the auger 178 continuously pushes wet recovered abrasive 144 through the interior region 190 of the cylindrical housing 176, the air eduction system 180 removes residual moisture from the recovered abrasive 144 to produce a de-watered abrasive 144A. By lowering the water content of the de-watered abrasive 144A prior to delivery to the dryer unit 300, the amount of energy needed to dry the de-watered abrasive 144 is reduced. Consequently, the operational costs of the abrasive recovery apparatus 100 are reduced, making the abrasive recovery operation more economically feasible.

One may note that several of the features of the air eduction system 180 may be varied from the embodiment described above and shown in the accompanying figures. For example, one of the air eduction ports, air eduction inlets, and airflow control valves may be eliminated, or any number of air eduction ports may be added. Alternately, an air eduction supply port may be added within the cylindrical housing 176 so that the flow of entrained air $F_2$ enters through a separate air eduction supply port rather than through the de-watered abrasive outlet 186. The auger may be replaced by an equivalent transport device. Of course, the dimensions and specific design details of the air eduction system components may also be varied without deviating from the scope and spirit of the invention.

Although the dimensions of the air eduction system 180 may be varied to achieve acceptable results, experiments have shown that the effectiveness of the air eduction system 180 is effected by the size of the auger 178 and inside diameter of the cylindrical housing 176. If the dimensions of the air eduction system 180 are held constant, reducing the diameter of the auger/cylindrical housing improves the de-watering effect of the air eduction system. For example, for an air eduction system 180 having first and second air eduction ports 182, 184 each being 0.5 inches in diameter, and a de-watered abrasive outlet 186 that is 1.0 inches in diameter, and a high-pressure supply of air $F_1$ of approximately 60 psi, a 1 inch diameter auger/cylindrical housing (inside diameter) is preferred over an auger/cylindrical housing of larger diameter. Regardless of the actual dimensions and operating conditions, the air eduction system 180 preferably (but not necessarily) provides a de-watered abrasive 144A having approximately 11 percent or less water content by weight.

Figure 9:
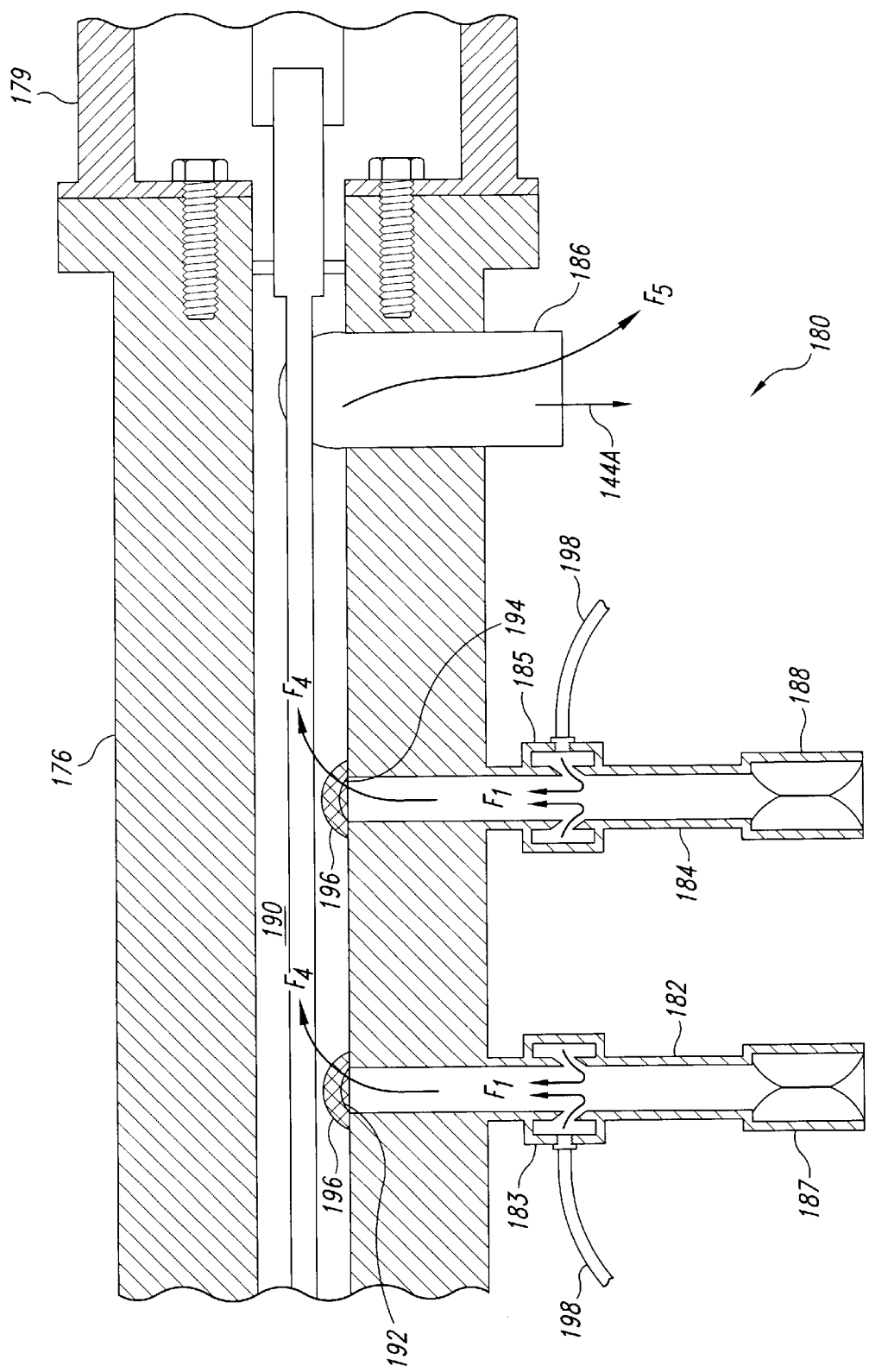
FIG. 9 is an enlarged partial cross-sectional view of the air eduction device of FIG. 7.

FIG. 9 is an enlarged partial cross-sectional view of the air eduction system 180 of FIG. 7 in a second mode of operation. In this second mode, the first and second airflow valves 187, 188 are closed, causing the high-pressure air $F_1$ to flow back through the first and second air eduction ports 182, 184 and into the interior region 190 of the cylindrical housing 176. The backflow $F_4$ of air passes through the screens 196 covering the first and second eductor apertures 192, 194, dislodging and clearing any of the wet recovered abrasive 144 from the screens 196. The backflow $F_4$ of air then passes through the de-watered abrasive 144A (not shown), and ejects a volume of the de-watered abrasive 144A out of the interior region 190 through the de-watered abrasive outlet 186. Thus, in the second mode of operation shown in FIG. 9, the air eduction system 180 blows a mixture of air and de-watered abrasive $F_5$ out the de-watered abrasive outlet 186.

In the second mode of operation, the air eduction system 180 advantageously provides the backflow $F_4$ of air through the screens 196 to keep the screens unblocked. The backflow $F_4$ ensures that the screens remain unblocked so that in the first mode of operation the wet entrained airflow $F_3$ passes readily through the screens 196 to maximize the drying of the recovered abrasive 144. By alternating between the first and second modes of operation, the wet recovered abrasive 144 may be de-watered and then the airflow through the air eduction apertures 192, 194 reversed to unblock the screens 196. For an air eduction system 180 having the dimensions and operating parameters described above, desirable results have been achieved by operating the system for approximately one-minute in the first mode of operation to de-water the recovered abrasive 144, and then switching to the second mode of operation for approximately one second to unblock the screens 196.

Another advantage is that in the second mode of operation, the air eduction system 180 blows the air and dried abrasive mixture $F_5$ out of the de-watered abrasive outlet 186 to help break up clumps of de-watered abrasive 144A. It is known that large clumps of abrasive are more difficult to dry than smaller clumps or individual abrasive particles. When the air eduction system 180 is operated in the second mode of operation shown on FIG. 9, the pulse of air and dried abrasive mixture $F_5$ has the desirable effect of helping to break LIP clumps of the de-watered abrasive 144A exiting from the de-watered abrasive outlet 186. Thus, the de-watered abrasive 144A may be more efficiently dried by the dryer unit 300 as described more fully below.

It is understood that in an alternate embodiment, the air eduction system 180 may be modified to operate using a vacuum system. For example, in the first mode of operation, the first and second air eductor ports 182, 184 may be coupled to the vacuum system so that the flow of entrained air $F_2$ is drawn into and through the interior region 190, and the wet entrained airflow $F_3$ is drawn through the screens 196 and out through the first and second airflow valves 187, 188. In this embodiment, the high-pressure eduction air $F_1$ from the air supply lines 198 would be unnecessary in the first mode of operation. In the second mode of operation, however, the first and second airflow valves 187, 188 would be closed to the vacuum system, and the high-pressure air $F_1$ from the air supply lines 198 would be used to generate the backflow $F_4$ of air through the screens 196. Furthermore, because the eduction air acts similar to a source of vacuum by drawing the flow of entrained air $F_2$ into and through the interior region 190, and the flow of wet entrained air $F_3$ out through the screens 196, the use of the term "eductor" throughout this discussion may in most cases be interchanged with the term "vacuum."

In another alternate embodiment, a de-watering airflow may simply be blown through the wet recovered abrasive 144. For example, the de-watered abrasive outlet 186 may open into a pressurizeable chamber 700 (shown in dashed lines in FIG. 8) coupled to a source of pressurized air 710 (e.g., a pump). With the pressurizeable chamber 700 pressurized, a de-watering airflow may flow from the pressurizeable chamber 700 through the interior region 190 and the wet recovered abrasive 144 and out of the housing 176. The de-watering airflow may exit the housing 176 through, for example, the ports 182, 184, or may simply blow the de-watering airflow out of the open end of the housing at which the auger 178 picks up the wet recovered abrasive 144 from the wet abrasive receptacle 172.

Figure 10:
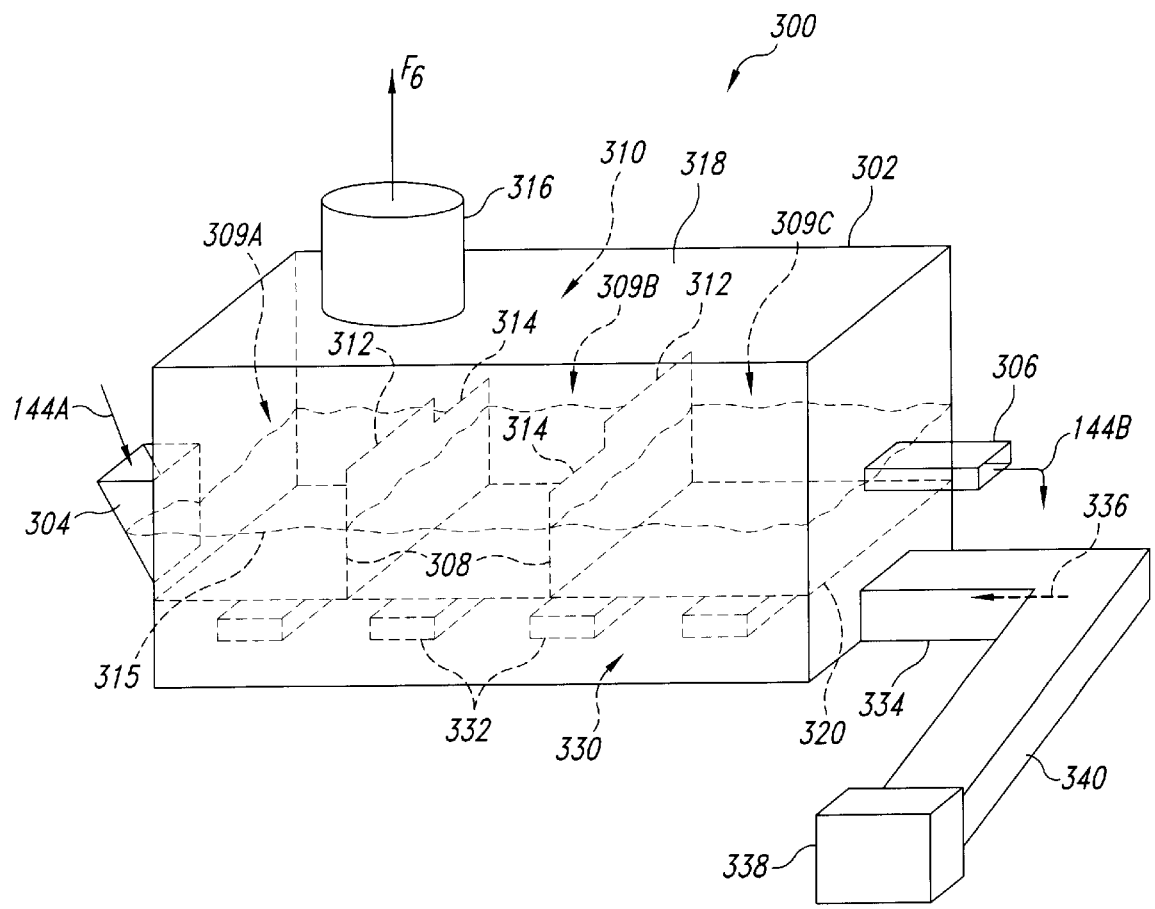
FIG. 10 is an isometric view of a dryer unit of the abrasive recovery apparatus of FIG. 2.

FIG. 10 is an isometric view of the dryer unit 300 of the abrasive recovery apparatus 100 of FIG. 2. The dryer unit 300 includes a containment tank 302 having a de-watered abrasive inlet 304 and a dried abrasive outlet 306. A horizontal floor partition 320 separates the interior of the containment tank 302 into an upper drying chamber 310 and a lower heater chamber 330. The floor partition 320 is porous and permits the flow of air from the lower heater chamber 330 to the upper drying chamber 310. A plurality of path control walls 308 span the drying chamber 310 and divide the drying chamber 310 into a plurality of drying sections 309 (designated as 309A, 309B, and 309C in FIG. 10). Each path control wall 308 includes an upper edge 312 having a notch 314 formed therein. A layer of drying abrasive 315 partially fills the drying chamber 310. The layer of drying abrasive 315 may include a priming layer of abrasive, or may be formed by the de-watered abrasive 144A entering the de-water abrasive inlet 304.

A plurality of heater elements 332 are positioned within the lower heater chamber 330. A heating air inlet 334 is disposed within a lower portion of de-containment tank 302 to allow a flow of heating air 336 to enter the lower heater chamber 330. A blower 338 is coupled to the heating air inlet 334 by a blower duct 340. An exhaust port 316 projects from an upper surface 318 of the containment tank 302 to vent exhaust gases from the drying chamber 310. A temperature sensor 317 is positioned within the exhaust port 316 to monitor the temperature of an exhaust flow $F_6$ from the drying chamber 310.

In operation, the de-watered abrasive 144A enters the drying chamber 310 through the de-watered abrasive inlet 304 and mixes with the layer of drying abrasive 315. The blower 338 forces the flow of heating air 336 into the lower heater chamber 330 and over the heater elements 332. The heating airflow 336 is heated by the heater elements 332 and passes through the porous floor partition 320. The heating airflow 336 then passes through the layer of drying abrasive 315 in the drying chamber 310. During this operation, the layer of drying abrasive 315 becomes a hot, fluidized layer and is heavily agitated by the heating airflow 336.

As damp de-watered abrasive 144A is introduced into the drying chamber 310, the level of the layer of abrasive 315 in the first drying section 309A continues to rise to the top of the first path control wall 308. The larger and damper clumps of de-watered abrasive 144A sink to the bottom of the layer of abrasive 315 and are reduced in size. As the de-watered abrasive 144A dries, it rises to the surface of the layer of abrasive 315 and works its way over the notches 314 of the path control walls 308 into the next drying section 309. In this embodiment, the notches 314 in the path control walls 308 are positioned at alternating sides of the containment tank 302 in a "labyrinth" arrangement to increase the travel path of the de-watered abrasive 144A through the drying chamber 310.

The heating airflow 336 passes through the layer of abrasive 315, separating and removing the residual, interstitial moisture contained within the de-watered abrasive 144A. The heating airflow 336 and residual moisture vapor form the wet exhaust flow $F_6$ that exits from the drying chamber 310 through the exhaust port 316. The de-watered abrasive 144A is dried to form a dried abrasive 144B that exits from the drying chamber 310 via the dried abrasive outlet 306.

Figure 11:
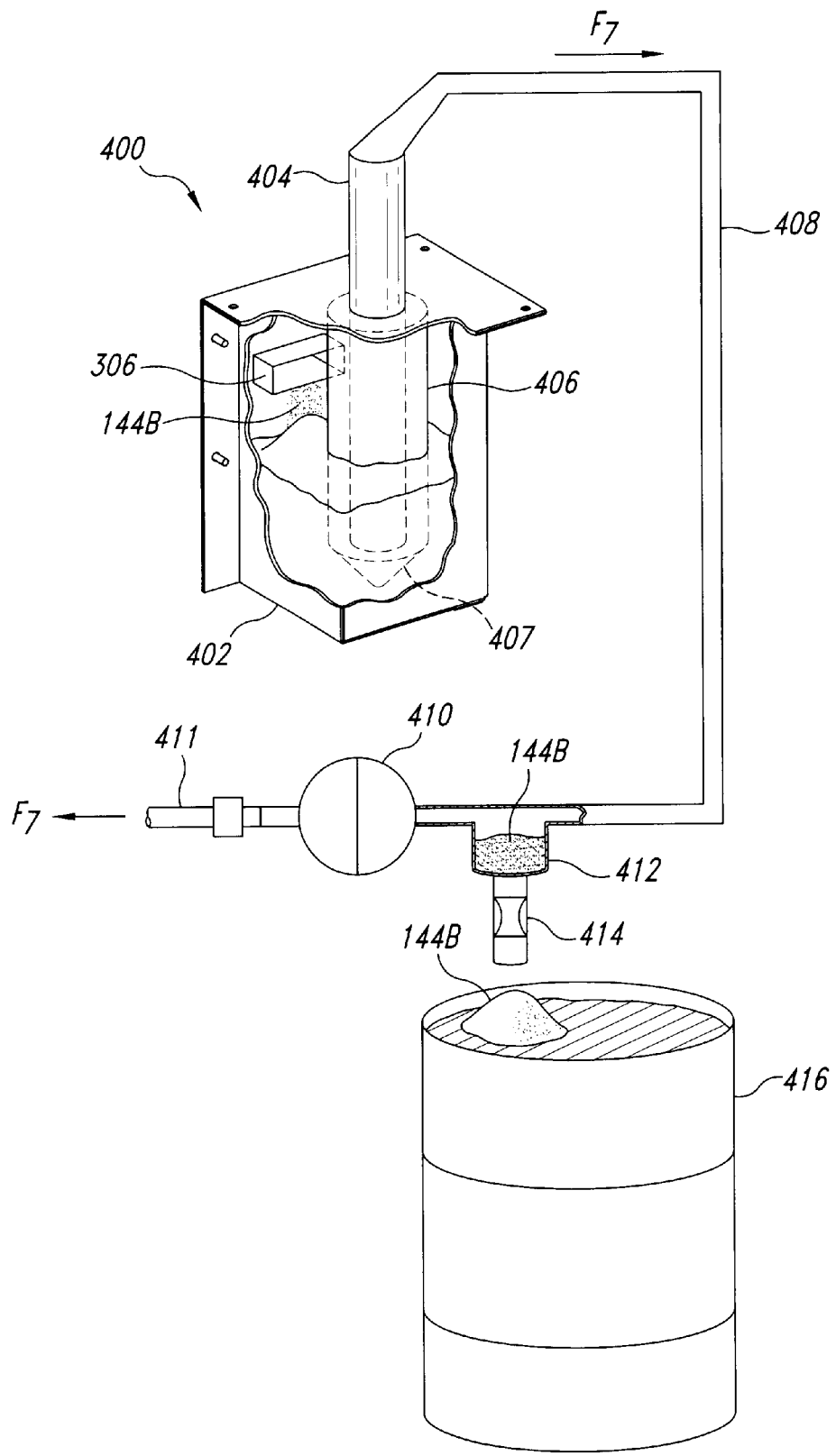
FIG. 11 is a partially-sectional isometric view of an embodiment of a vacuum transport device of the abrasive recovery apparatus of FIG. 2.

FIG. 11 is a partially sectional isometric view of an embodiment of a vacuum transport system 400 of the abrasive recovery apparatus 100 of FIG. 2. The vacuum transport system 400 includes a dried abrasive receptacle 402 that receives and contains the dried abrasive 144B from the dried abrasive outlet 306 of the dryer unit 300. A vacuum pickup 404 is partially inserted into the dried abrasive 144B within the dried abrasive receptacle 402. A standoff housing 406 surrounds the vacuum pickup 404 and is also partially inserted into the dried abrasive 144B within the dried abrasive receptacle 402. A vacuum line 408 couples the vacuum pickup 404 to a vacuum pump 410, and the vacuum pump 410 is coupled to a vacuum exhaust outlet 411. An abrasive catch vessel 412 is coupled with the vacuum line 408 between the vacuum pickup 404 and the vacuum pump 410. The abrasive catch vessel 412 is equipped with an outlet valve 414 that controllably releases the dried abrasive 144B into a storage vessel 416.

The vacuum pump 410 pulls a vacuum in the vacuum line 408 and vacuum pickup 404, drawing a flow of transport air $F_7$ and dried abrasive 144B out of the dried abrasive receptacle 402 and into the vacuum line 408. As the vacuum pickup 404 withdraws the dried abrasive 144B from the dried abrasive receptacle 402, an approximately conical depression 407 is formed at the lower end of the standoff housing 406. The flow of transport air $F_7$ and dried abrasive 144B is drawn through the vacuum line 408 and is deposited into the abrasive catch vessel 412. The outlet valve 414 periodically opens to release the dried abrasive 144B into the storage vessel 416. The flow transport air $F_7$ passes through the vacuum pump 410 and exits through the vacuum exhaust outlet 411.

The vacuum transport system 400 advantageously maintains the performance of the vacuum pickup 404 for removing the dried abrasive 144B despite variations in the level of the dried abrasive 144B within the dried abrasive receptacle 402. The performance of the vacuum pickup 404 is achieved when the vacuum pickup 404 is maintained at a close standoff distance from the surface of the dried abrasive 144B. If the vacuum pickup 404 is too far from the surface of the dried abrasive 144B, none of the dry abrasive 144B will be transported. If the vacuum pickup 404 is too close to the surface of the dried abrasive 144B, the vacuum pickup 404 will clog. To overcome the problem presented by variations in the level of the dried abrasive 144B, the standoff housing 406 is positioned proximate the vacuum pickup 404 to maintain the desired close standoff distance between the surface of the dried abrasive 144B and the vacuum pickup 404. The angle of the conical depression 407 is controlled by the angle of repose of the dried abrasive 144B as the dried abrasive 144B tumbles into the conical depression 407. By adjusting the position of the standoff housing 406 relative to the vacuum pickup 404, the desired close standoff distance is maintained.

Figure 12:
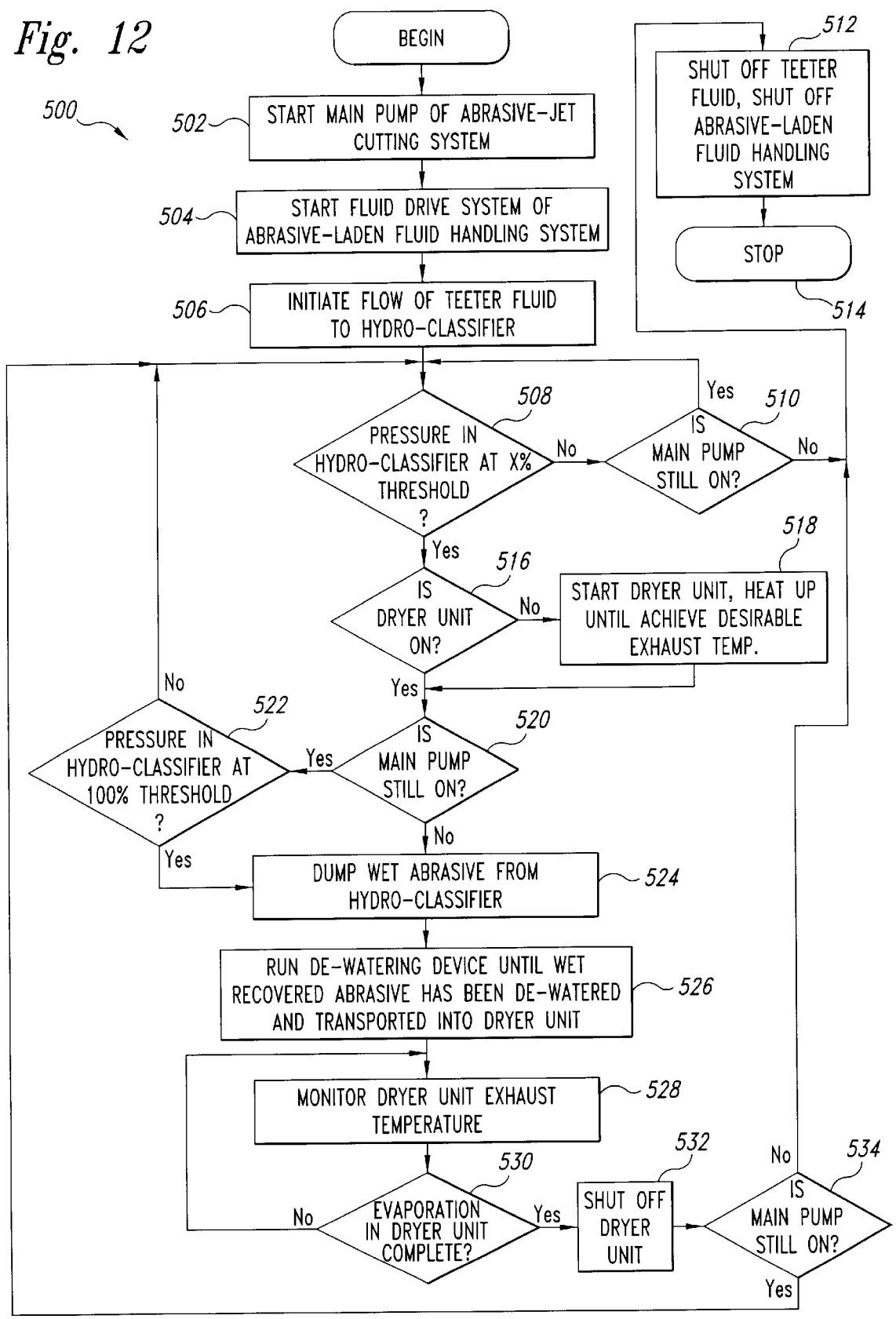
FIG. 12 is a flowchart representation of an embodiment of a process for operating the abrasive recovery apparatus of FIG. 2.
Figure 13:
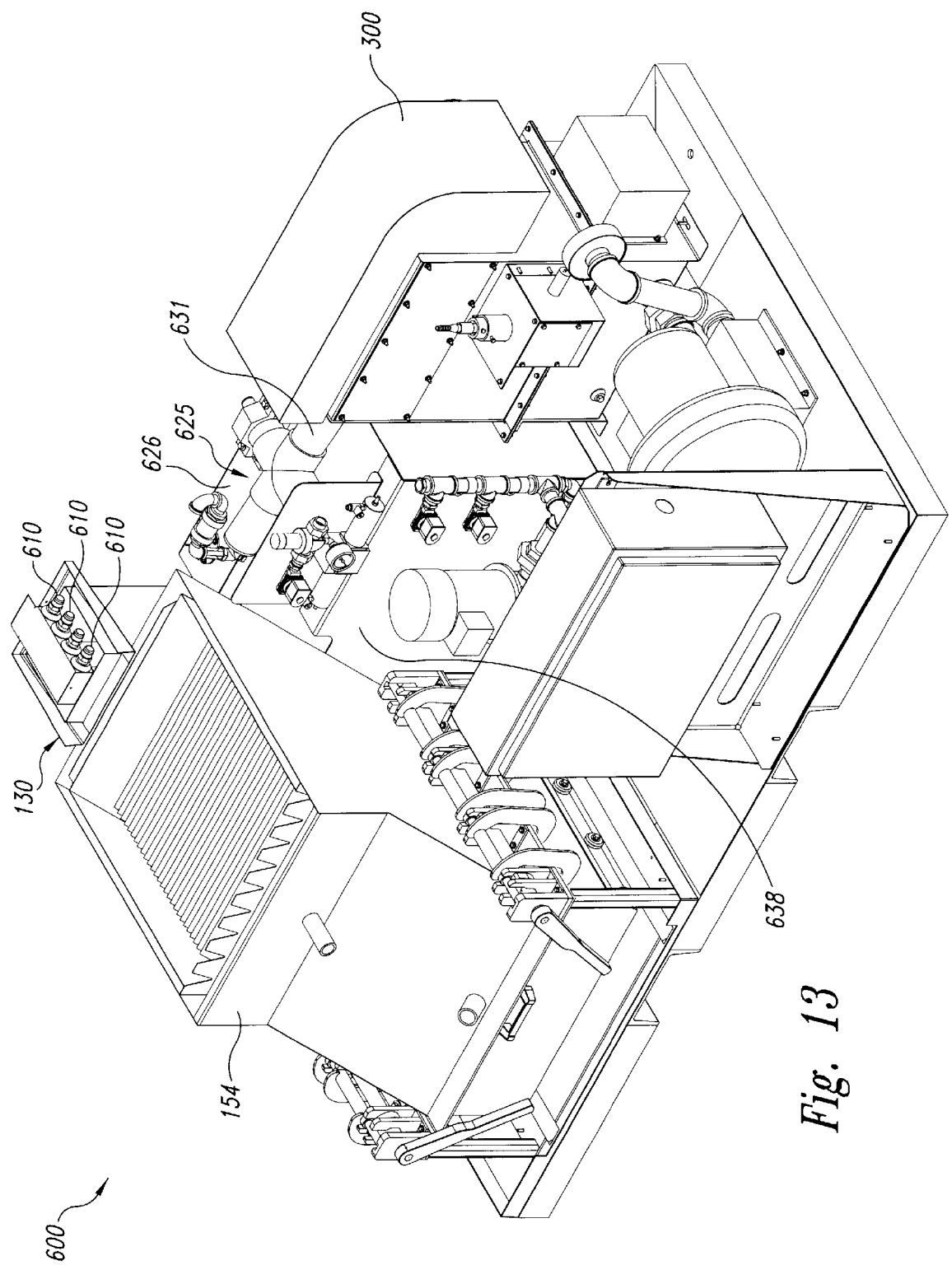
FIG. 13 is an isometric view of an abrasive recovery apparatus provided in accordance with an alternative embodiment of the present invention.

FIG. 12 is a flowchart representation of an embodiment of a process 500 for operating the abrasive recovery apparatus 100 of FIG. 2. In this embodiment, the operating process 500 includes starting the main pump of the abrasive jet cutting system 502. Next, the fluid drive system of the abrasive-laden fluid handling system is started 504. The flow of teeter fluid to the hydro-classifier is also started 506.

After these systems are started, the pressure in the hydro-classifier is monitored, and a determination is made whether the pressure in the hydro-classifier has reached a certain percentage (X%) of a predetermined threshold pressure 508. The predetermined threshold pressure is the pressure at which the hydro-classifier is considered to be "full" of wet recovered abrasive and the wet recovered abrasive outlet of the hydro-classifier needs to be opened.

If the pressure in the hydro-classifier has not reached the certain percentage (X%) of the predetermined threshold pressure 508, then a determination is made whether the main pump of the abrasive-jet cutting system is still on 510. If the main pump is not running, then the teeter fluid flow is shut off, and the abrasive-laden fluid handling system is also shut off 512. The teeter fluid flow and the abrasive-laden fluid handling system may be shut off simultaneously or successively. Operation of the abrasive recovery apparatus is then complete 514. If the main pump is not shut off and is still running 510, however, the offering process continues to monitor the pressure in the hydro-classifier 508.

When the pressure in the hydro-classifier has reached the certain percentage (X%) of the predetermined threshold pressure 508, then a determination is made whether the dryer unit has been started 516. If not, the dryer unit is started by turning on the heater elements and the blower 518. The heater elements may be adjustably controlled until a temperature of the exhaust flow $F_6$ the dryer unit reaches a desired exhaust flow temperature.

Next, it is determined whether the main pump of the abrasive jet cutting system is still on 520. If the main pump is still on, a determination is made whether the pressure in the hydro-classifier has reached 100% of the predetermined threshold pressure 522. If the pressure has not reached the predetermined threshold pressure, the operating process returns to the monitoring of the pressure in hydro-classifier 508.

If the main pump is not still on 520, or if the main pump is still on 520 and the pressure in the hydro-classifier has reached 100% of the predetermined threshold pressure 522, the wet recovered abrasive is dumped from the hydro-classifier via the wet abrasive outlet into the wet abrasive receptacle 524. After the wet recovered abrasive is dumped, the de-watering device is operated until the wet recovered abrasive has been dewatered and transported into the dryer unit 526. Next, the exhaust temperature of the dryer unit is monitored 528.

Based on the exhaust temperature of the dryer unit, the determination is made whether evaporation in the dryer unit is complete 530. This may be accomplished in various ways, including by monitoring the time history of the exhaust temperature. For example, the initial exhaust temperature may be the desirable exhaust temperature prior to entry of the de-watered abrasive into the dryer unit. As the de-watered abrasive enters dryer unit, the exhaust temperature may drop due to the evaporation of residual fluid in the de-watered abrasive. After a period within the dryer unit, the exhaust temperature may then rise again to the desirable exhaust temperature, indicating that the residual, interstitial fluid within the de-watered abrasive has been removed, and the drying of the de-watered abrasive is complete.

If the evaporation in the dryer unit is not complete 530, the exhaust temperature of the dryer unit continues to be monitor 528. After the evaporation in the dryer unit is complete 530, the dryer unit shuts off 532. The determination is then made whether the main pump of the abrasive jet cutting system is still on 534. If it is, the operating process returns to the monitoring of the pressure in the hydro-classifier 508, and a process is repeated. If, however, the main pump is not still on 534, the teeter fluid flow to shut off and the abrasive-laden fluid handling system to shut off 512, and the operating process is terminated 514.

Generally, the predetermined threshold pressure for considering the hydro-classifier to be full of wet recovered abrasive, the certain pressure (X%) at which the dryer unit is turned on, and the desired exhaust temperature of the dryer unit are all system specific characteristics. The actual values of these parameters that may be used in the operating process 500 may depend on several system specific variables, including, for example, the dimensions of the components (e.g., the hydro-classifier) of the abrasive recovery apparatus 100, the operating conditions of the abrasive jet cutting system, the type of abrasive and cutting fluid being used, the power and efficiency of the dryer unit, and other variables.

Several aspects of the operating process 500 advantageously save energy and reduce operating costs compared with the prior art process. For example, because the dryer unit is not started until the pressure in the hydro-classifier has achieved the certain percentage (X%) of the predetermined threshold pressure, energy savings are realized. Also, by monitoring the exhaust temperature from the dryer unit and shutting off the dryer unit when evaporation is complete, additional energy savings are achieved. In addition, the de-watering device is operated selectively rather than continuously, and is used only when necessary to de-water and transport the wet recovered abrasive from the wet recovered abrasive receptacle to the dryer unit. Finally, the operating process contains several steps to determine whether the main pump of the abrasive jet cutting system is still on, and shuts the abrasive recovery apparatus down automatically when the abrasive-jet cutting system is shut down.

An abrasive recovery apparatus 600 provided in accordance with an alternative, preferred embodiment of the present invention is illustrated in FIGS. 13–18. Several of the components of the system are the same in design and function as those described with respect to the abrasive recovery apparatus 100 of FIG. 2. Where system components are alike, same reference numbers are used, and those components will not be described again in the discussion below of the abrasive recovery apparatus 600.

Figure 14:
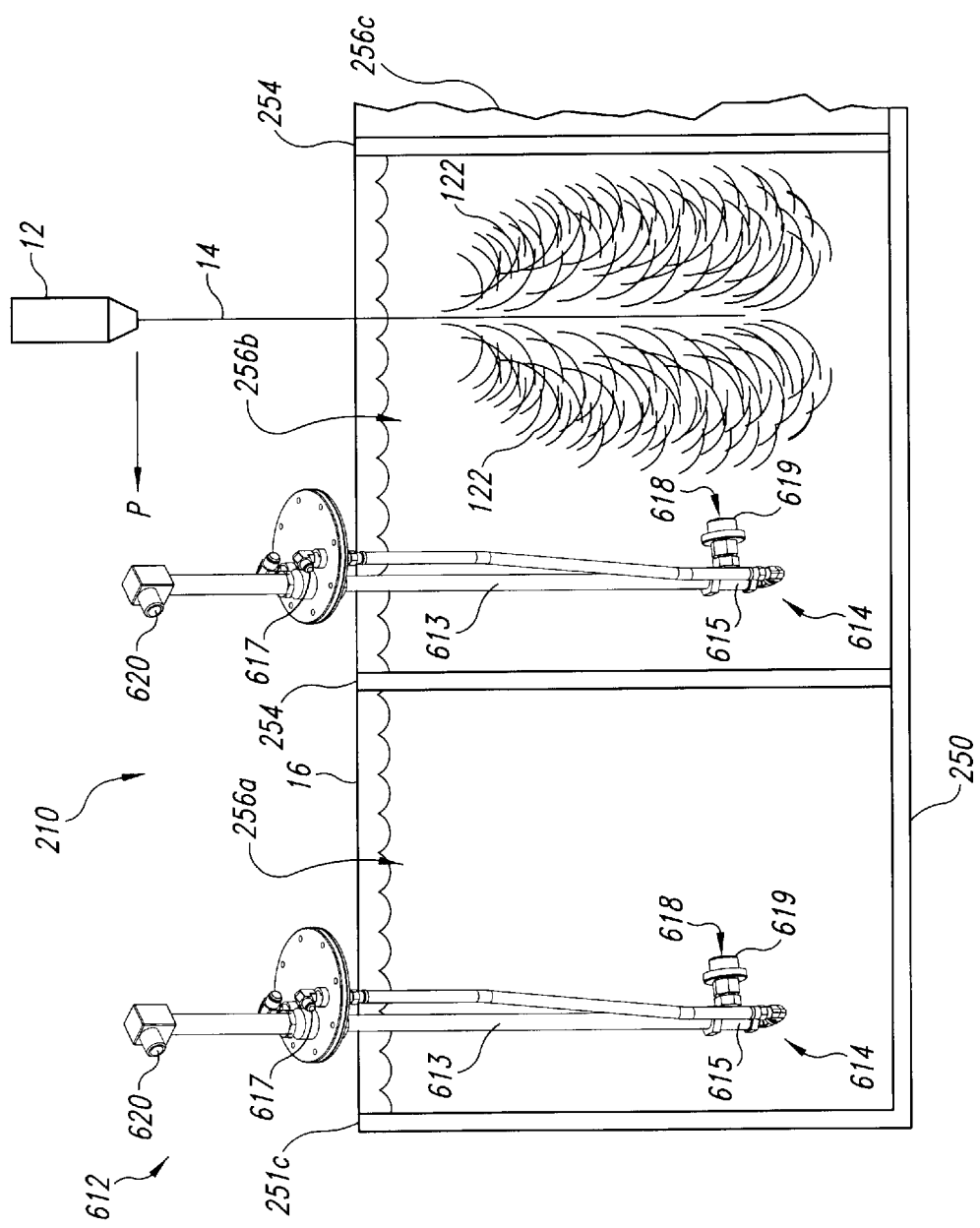
FIG. 14 is a partial cross-sectional view of an abrasive-laden fluid collection device forming a portion of the abrasive recovery apparatus of FIG. 13.

In a preferred embodiment, the abrasive recovery apparatus 600 includes a plurality of abrasive-laden fluid handling devices 612. The number of handling devices 612 is dependent on the size of catcher tank 16. As best seen in FIG. 14, each of the abrasive-laden fluid handling devices 612 is positioned at least partially within a catcher tank 16. The handling device 612 includes a conduit 613 coupled to a fluid eduction assembly 614. The fluid eduction assembly 614 includes a fluid eductor 615 coupled to a source of fluid via intake 618. The eduction assembly 614 causes fluid to flow through the conduit 613, generating a vacuum that entrains abrasive-laden fluid from the catcher tank 16 into the conduit 613 through an inlet 617. Inlet 617 is in fluid communication between the catcher tank 16 and the conduit 613. A screen 619 is positioned adjacent the inlet 617 to prevent debris from entering the conduit 613. In this manner, the fluid eduction assembly 614 causes abrasive-laden fluid to flow from the catcher tank 16 upward through the conduit 613 and out of the abrasive-laden fluid outlet 620. Depending on the size of the catcher tank, a selected number of handling devices 612 will be positioned within the catcher tank at selected locations. The flow of abrasive-laden fluid from each of the fluid outlets 620 is directed into an associated inlet 610 of a hydro-classifier 130. By using fluid eduction in accordance with a preferred embodiment of the present invention to remove abrasive-laden fluid from the catcher tank, the concentration of abrasive is increased, eliminating the need for a pre-classifier 120, while still allowing the use of a smaller hydro-classifier 130, as compared to conventional systems.

Figure 15:
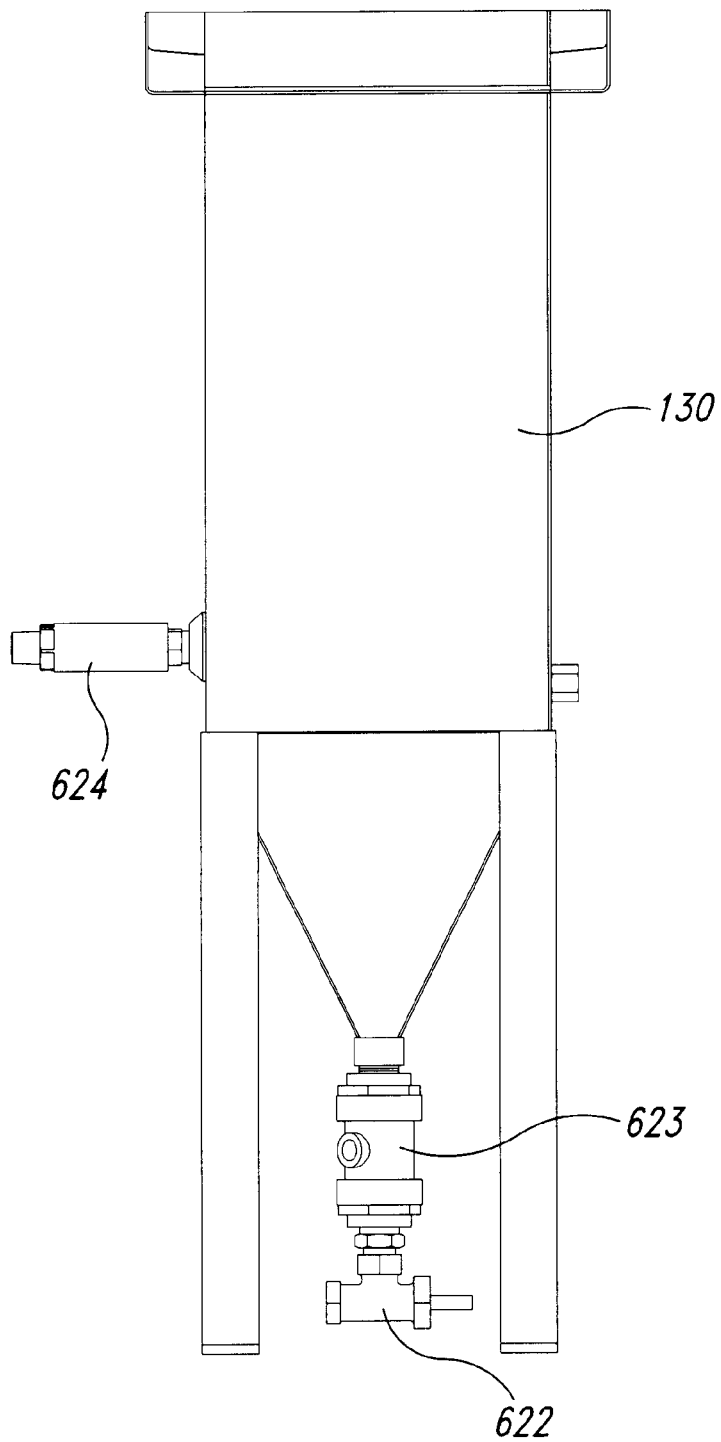
FIG. 15 is a front elevational view of a hydro-classifier of the abrasive recovery apparatus of FIG. 13.

The hydro-classifier 130 of the abrasive recovery apparatus 600 functions as described previously. However, as illustrated in FIG. 15, the hydro-classifier includes a monitoring system 621, further comprising a fluid eductor 622 coupled to a bottom region of the hydro-classifier adjacent valve 623. A pressure transducer 624 monitors the pressure in the hydro-classifier, and generates a first signal to open the valve 623 and activate the fluid eductor 622 to transport wet abrasive from the wet abrasive outlet of the hydro-classifier to a wet abrasive intake 627 of a de-watering device 625. When valve 623 is open and the eductor 622 of the hydro-classifier is activated, the fluid educators 615 on the abrasive-laden fluid handling devices 612 are deactivated, to prevent the further flow of abrasive fluid to the hydro-classifier. In response to a second predetermined, measured pressure level in the hydro-classifier, the pressure transducer generates a second signal to close the valve 623 and deactivate the fluid eductor 622, thereby stopping the flow of wet abrasive to the de-watering device 625. Eductors 615 are also reactivated, again causing abrasive-laden fluid to flow to the hydro-classifier. In this manner, a selected quantity of wet abrasive is delivered to the de-watering device 625 in batches.

Figure 16:
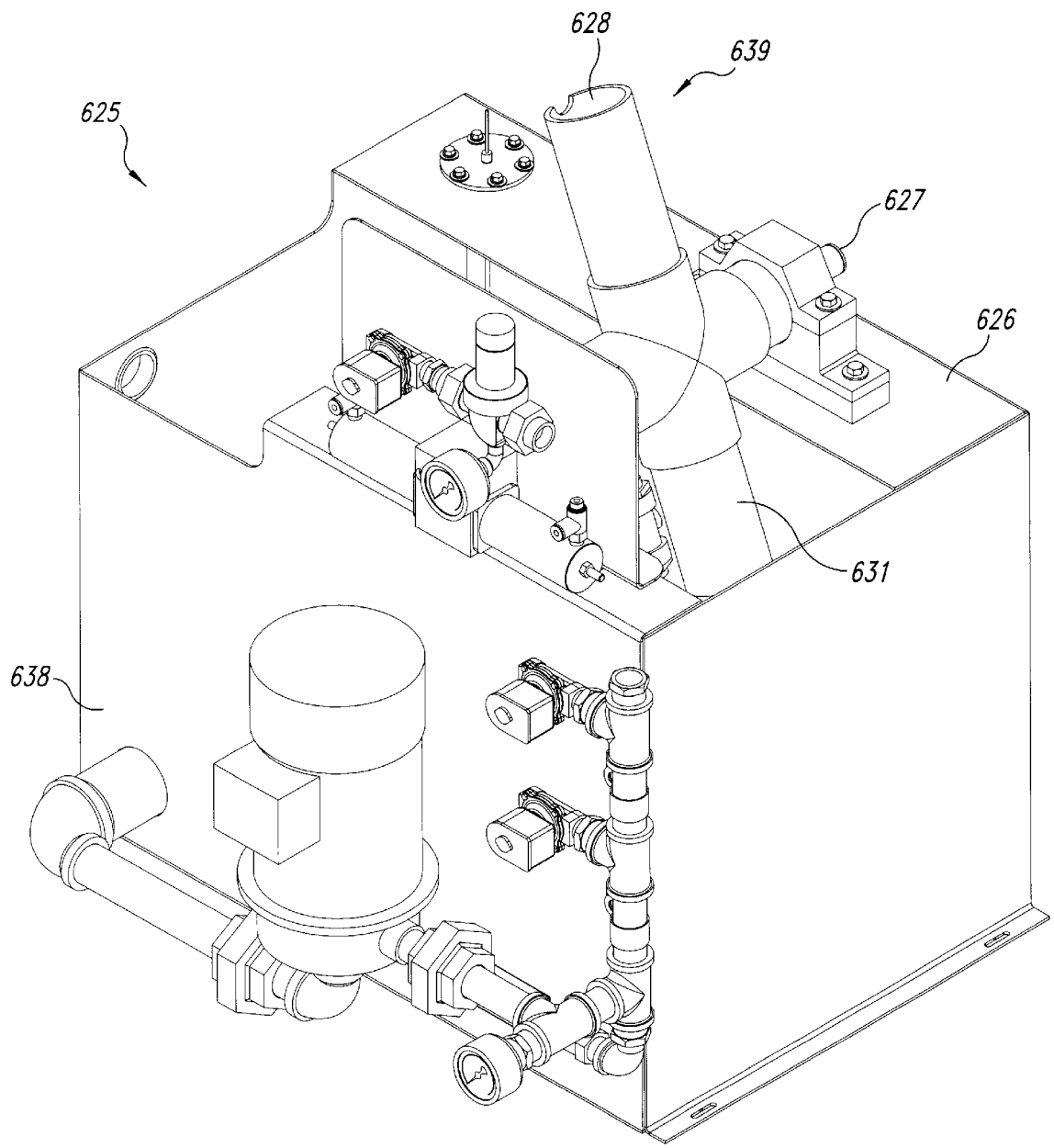
FIG. 16 is an isometric view of a de-watering device of the abrasive recovery apparatus of FIG. 13, with a collection tube shown in a first position.
Figure 17:
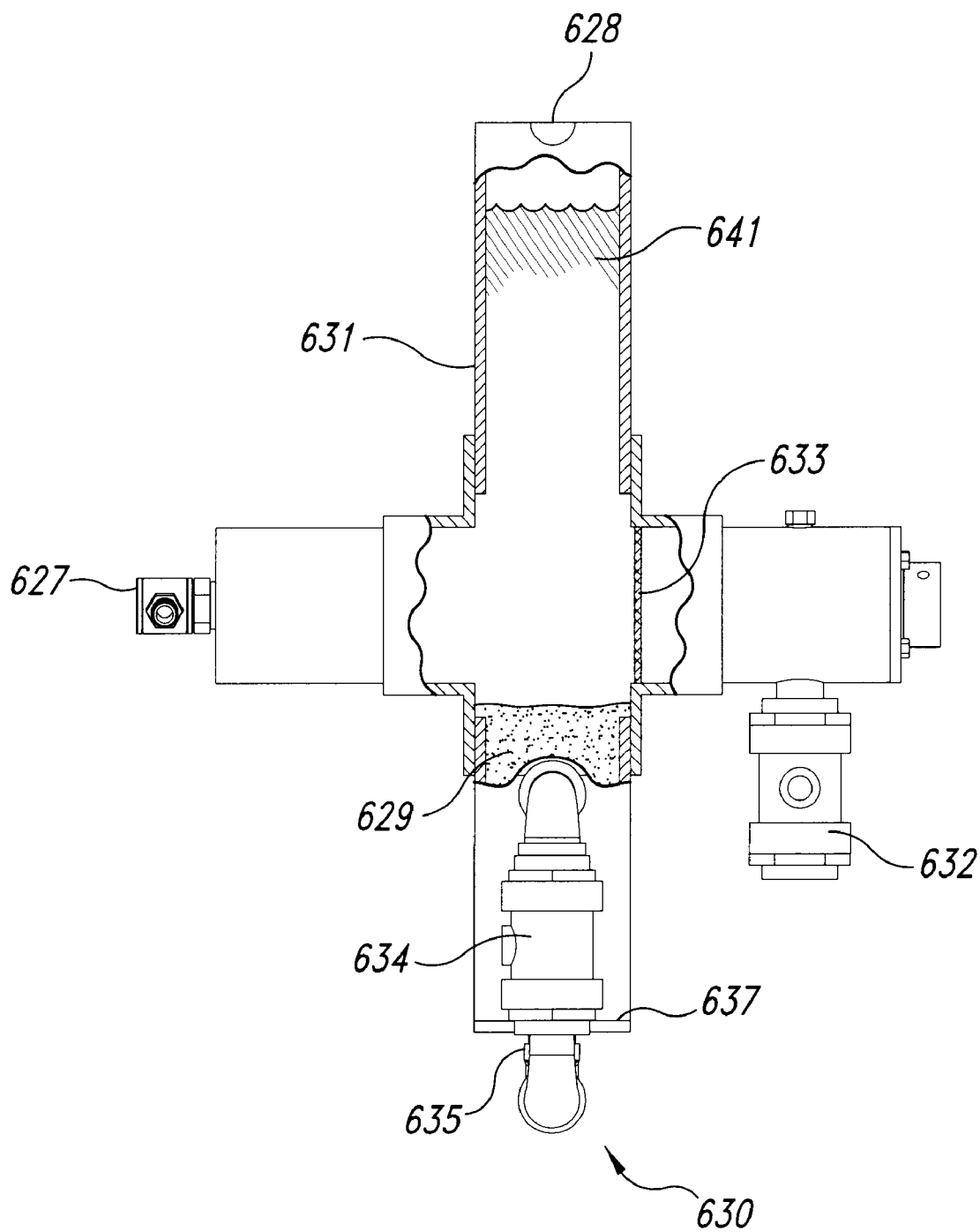
FIG. 17 is a partial cross-sectional elevational view of a sub-assembly of the de-watering device of FIG. 16.
Figure 18:
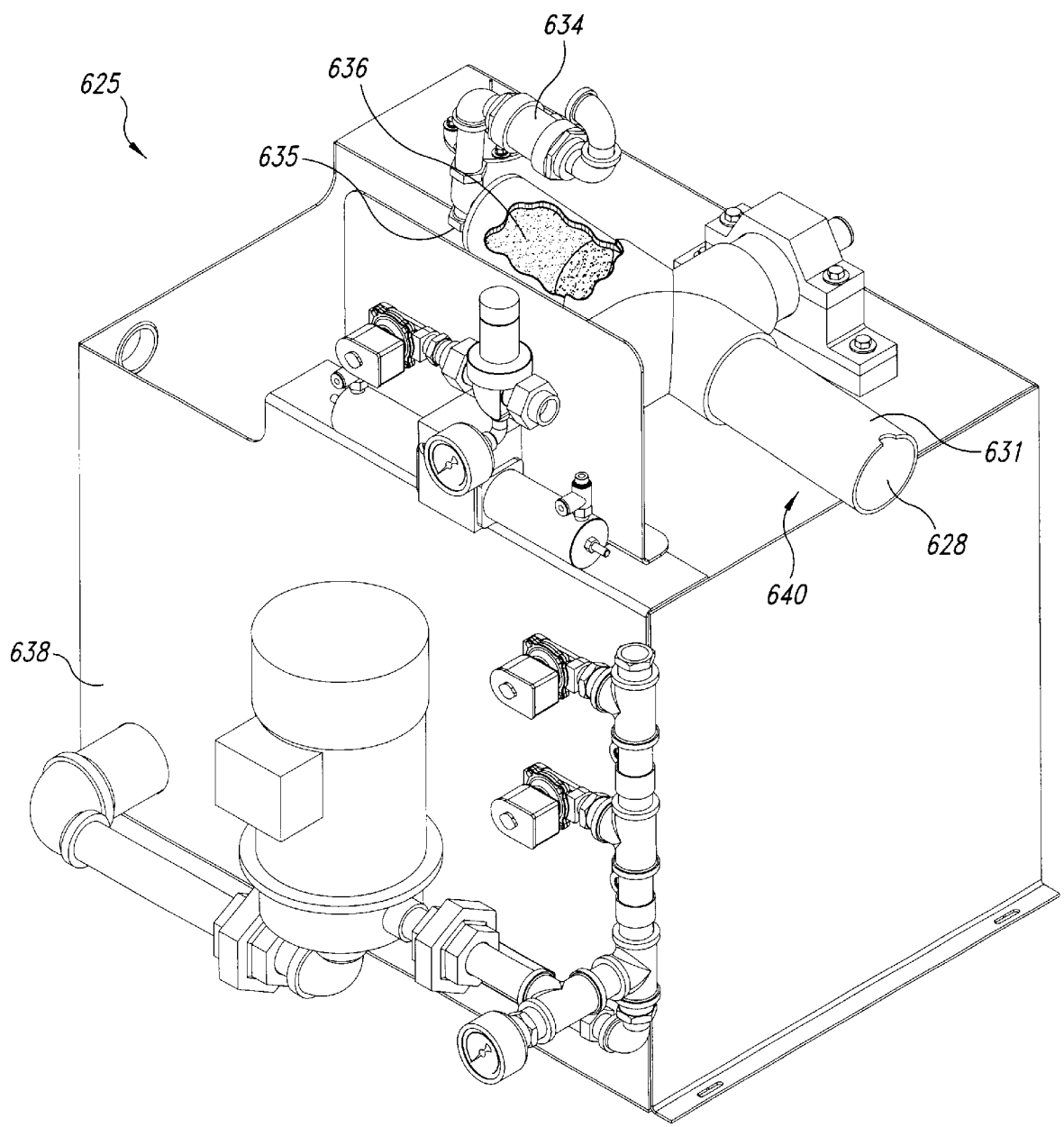
FIG. 18 is an isometric view of a de-watering device of the abrasive recovery apparatus of FIG. 13, with a collection tube shown in a second position.

As illustrated in FIGS. 16–18, the de-watering device 625 includes a housing 626 provided with a collection tube 631. The collection tube 631 is in fluid communication with a wet abrasive intake 627 and a de-watered abrasive outlet 628. As best seen in FIGS. 16 and 17, the collection tube 631 is positioned in a substantially vertical position 639, such that as the wet abrasive is provided to the de-watering device 625, the abrasive collects in a bottom region of the collection tube 631 adjacent a screen 637. Fluid 641 from the wet abrasive collects substantially above the abrasive as the abrasive settles in the bottom region of the collection tube 631. If the water level in the collection tube 631 reaches the top of the tube as the device is filling with wet abrasive, the fluid 641 is free to flow out of the outlet 628 into a sump 638.

Once a selected amount of wet abrasive 629 has been provided to the collection tube 631, and the flow of wet abrasive to the de-watering device 625 has been stopped, as described previously, a valve 632 is opened to decant the fluid 641 from the collection tube 631. A screen 633 is positioned adjacent the decanting valve 632 to substantially prevent abrasive from exiting the de-watering device via valve 632. The de-watering device 625 further includes an eduction system 630 having an air eductor 635 and a second valve 634 in fluid communication with a source of pressurized fluid, such as air. Once the first decanting valve 632 is open for a predetermined period of time, the air eductor 635 is activated, thereby drawing air through the abrasive to remove interstitial moisture from the abrasive. The air eductor 635 may be controlled automatically, being activated for a set amount of time. The de-watering device 625 therefore removes water from the abrasive in two stages, by decanting water via the first valve 630 and by forcing air through the abrasive via an air eductor 635.

After this two step de-watering process is complete, a slug 636 of de-watered abrasive is positioned in the bottom region of collection tube 631. The collection tube 631 is rotated to a substantially horizontal position 640, and the slug 636 is ejected from the tube 631 via pressurized air provided through valve 634. In this manner, the screen 637 at the bottom of the collection tube 631 is backflushed, to remove abrasive from the screen. The slug 636 is discharged to the entrance of a dryer unit 300, and dried and further processed as described above with respect to abrasive recovery apparatus 100. The collection tube 631 is then rotated to a substantially vertical position 639 to receive another volume of wet abrasive. As the tube 631 is being returned to a vertical position, air may be flushed through the valve 632 to clear screen 633 and improve the efficiency of the next decanting cycle.

In a preferred embodiment, a pump on the sump 638 provides fluid to the fluid eductors 615 of the fluid handling devices 612 and to the fluid eductor 622 of the hydro-classifier. When the level of fluid in the sump 638 exceeds a pre-selected level, all of the fluid eductors 615 and 622 are deactivated, and a valve on the sump is opened to siphon off extra fluid back to the catcher tank 16. In this manner, the system is self-contained. In addition, an abrasive recovery apparatus 600 provided in accordance with a preferred embodiment of the present invention is cost effective to manufacture, and eliminates wear items, such as an auger.

Improved apparatus and methods for recovering abrasive from an abrasive-laden fluid for use with abrasive jet cutting systems have been shown and described. From the foregoing, it will be appreciated that although embodiments of the invention have been described herein for purposes of illustration, various modifications may be made without deviating from the spirit of the invention. Thus, the present invention is not limited to the embodiments described herein, but rather is defined by the claims which follow.

What is claimed is:

1. An abrasive recovery apparatus for use with an abrasive-jet cutting system including a catcher tank, comprising:
   an abrasive-laden fluid handling device having an abrasive-laden fluid conduit at least partially disposed within the catcher tank and an abrasive-laden fluid outlet;
   a hydro-classifier fluidly coupled to the abrasive-laden fluid outlet, the hydro-classifier having a teeter fluid inlet couplable to a fluid source providing a teeter fluid flow that mixes with a flow of abrasives from the abrasive-laden fluid outlet to form a fine particle flow and a wet abrasive, the hydro-classifier having a fine particle flow outlet and a wet abrasive outlet;
   a de-watering device including a housing having a wet abrasive intake and a de-watered abrasive outlet, the wet abrasive intake being coupled to the wet abrasive outlet of the hydro-classifier to receive the wet abrasive, the housing being coupled to an eduction system, the eduction system selectively drawing air through the wet abrasive to remove interstitial moisture from the wet abrasive resulting in de-watered abrasive; and
   a dryer unit having a de-watered abrasive inlet positioned to receive the de-watered abrasive from the de-watered abrasive outlet, the dryer unit having a heating element and a dried-abrasive outlet.

2. The abrasive recovery apparatus according to claim 1 wherein the abrasive-laden fluid handing device further comprises a fluid eduction assembly coupled to a source of fluid and an inlet in fluid communication with the catcher tank and with the abrasive-laden fluid conduit, a volume of fluid being drawn through the conduit by the fluid eduction system to generate a vacuum at the inlet and entrain and transport abrasive-laden fluid from the catcher tank through the inlet and conduit to the abrasive-laden fluid outlet.

3. The abrasive recovery apparatus according to claim 2, further comprising a screen provided on the inlet to prevent contaminants larger than a selected size from entering the conduit.

4. The abrasive recovery apparatus according to claim 1, further comprising a monitoring system, the monitoring system stopping the flow of wet abrasive to the housing of the de-watering device when it reaches a pre-selected level within the housing.

5. The abrasive recovery apparatus according to claim 4 wherein the monitoring system is coupled to the hydro-classifier and generates a first signal to open a first valve positioned between the wet-abrasive outlet of the hydro-classifier and the wet-abrasive intake of the de-watering device and to activate an eductor positioned adjacent the first valve to transport wet abrasive from the hydro-classifier to the de-watering device, and generates a second signal to close the first valve and deactivate the eductor to selectively prevent the transport of wet abrasive to the de-watering device.

6. The abrasive recovery apparatus according to claim 5 wherein the monitoring system includes a pressure transducer that senses the pressure in the hydro-classifier, the first and second signals being generated by the pressure transducer in response to the pressure in the hydro-classifier.

7. The abrasive recovery apparatus according to claim 4 wherein a portion of the housing forms a collection tube in which the wet abrasive collects, the collection tube being movable from a first substantially vertical position to a second substantially horizontal position, a second valve coupled to the housing selectively allowing fluid to decant off of the wet abrasive and a third valve coupled to the housing selectively allowing the eduction system to draw air through the wet abrasive while the collection tube is in the substantially vertical position, a plug of de-watered abrasive being ejected from the collection tube by a pressurized stream of air forced into the housing via the third valve.

8. A method of recovering abrasive from an abrasive-laden fluid contained within a catcher tank of an abrasive jet cutting system, comprising:

removing abrasive-laden fluid from the catcher tank;

separating the abrasive-laden fluid into a wet recovered abrasive and a fine particle flow;

de-watering the wet recovered abrasive to form a de-watered abrasive;

drying the de-watered abrasive to form a dry recovered abrasive; and generating a flow of fluid through a conduit positioned in the catcher tank via a fluid eductor to entrain abrasive-laden fluid from the catcher tank into the flow of fluid through the conduit.

9. A method of recovering abrasive from an abrasive-laden fluid contained within a catcher tank of an abrasive jet cutting system, comprising:

removing abrasive-laden fluid from the catcher tank;

separating the abrasive-laden fluid into a wet recovered abrasive and a fine particle flow;

de-watering the wet recovered abrasive to form a de-watered abrasive;

drying the de-watered abrasive to form a dry recovered abrasive;

filling a collection tube with wet recovered abrasive to a pre-selected level;

stopping the flow of wet recovered abrasive to the collection tube;

decanting fluid off of the wet recovered abrasive out of the collection tube;

drawing air through the wet recovered abrasive to further de-water the abrasive thereby generating a slug of de-watered abrasive; and ejecting the slug from the collection tube to a dryer.

10. The method according to claim 9, further comprising:

measuring the pressure in a hydro-classifier that separates the abrasive-laden fluid into the wet recovered abrasive and the fine particle flow; and allowing wet recovered abrasive to flow to the collection tube in response to a first predetermined pressure reading and preventing the flow of wet recovered abrasive to the collection tube in response to a second predetermined pressure reading.

11. The method according to claim 10, further comprising:

selectively opening and closing a valve of the hydro-classifier and selectively activating and deactivating an eductor coupled to the hydro-classifier in response to the measured pressure in the hydro-classifier.

12. The method according to claim 9, further comprising backflushing a screen through which fluid is decanted off of the wet recovered abrasive.

13. The method according to claim 9, further comprising:

tilting the collection tube from a substantially upright position to a substantially horizontal position prior to ejecting the slug of de-watered abrasive from the collection tube.

* * * * *